US012064388B1

(12) United States Patent
Schmidt et al.

(10) Patent No.: US 12,064,388 B1
(45) Date of Patent: Aug. 20, 2024

(54) FLEXIBLE END EFFECTORS WITH AN APERTURE

(71) Applicant: InnerWave Health LLC, Austin, TX (US)

(72) Inventors: Robert Schmidt, Austin, TX (US); Neal Piper, Huntington Beach, CA (US)

(73) Assignee: InnerWave Health LLC, Austin, TX (US)

( * ) Notice: Subject to any disclaimer, the term of this patent is extended or adjusted under 35 U.S.C. 154(b) by 0 days.

(21) Appl. No.: 18/230,910

(22) Filed: Aug. 7, 2023

(51) Int. Cl.
*A61H 23/00* (2006.01)
*A61H 23/02* (2006.01)

(52) U.S. Cl.
CPC ....... *A61H 23/006* (2013.01); *A61H 23/0245* (2013.01); *A61H 2201/1669* (2013.01); *A61H 2201/169* (2013.01)

(58) Field of Classification Search
CPC .......... A61H 23/00; A61H 23/004–006; A61H 23/02–06; A61H 2201/1669; A61H 2201/169; A61H 15/00–02
See application file for complete search history.

(56) References Cited

U.S. PATENT DOCUMENTS

| | | | | |
|---|---|---|---|---|
| 4,745,910 | A | 5/1988 | Day et al. | |
| 6,013,040 | A | 1/2000 | Morgenstern et al. | |
| 6,478,755 | B2 | 11/2002 | Young | |
| 7,503,923 | B2 | 3/2009 | Miller | |
| 9,107,799 | B2 | 8/2015 | Muchisky | |
| 9,872,813 | B2 | 1/2018 | Giraud et al. | |
| 10,758,452 | B2 | 9/2020 | Wersland et al. | |
| 10,835,767 | B2 | 11/2020 | Capelli et al. | |
| 2005/0142093 | A1* | 6/2005 | Skover | A61Q 19/08 601/84 |
| 2005/0159685 | A1 | 7/2005 | Klein et al. | |
| 2008/0018167 | A1* | 1/2008 | Fuji | A61H 15/0092 601/84 |
| 2009/0221944 | A1* | 9/2009 | Hobson | A61H 23/0218 601/135 |
| 2015/0080774 | A1* | 3/2015 | Olaya | A61H 15/00 601/121 |
| 2019/0247271 | A1 | 8/2019 | Lee et al. | |
| 2020/0072268 | A1 | 3/2020 | Wersland et al. | |
| 2020/0155410 | A1* | 5/2020 | Smith, Jr. | A61H 7/001 |
| 2020/0214930 | A1* | 7/2020 | Wersland | A61H 23/006 |
| 2020/0214932 | A1* | 7/2020 | Pahl | A61H 9/005 |
| 2020/0281805 | A1* | 9/2020 | Qiu | A61H 1/00 |
| 2021/0322257 | A1 | 10/2021 | Lee et al. | |
| 2022/0125670 | A1 | 4/2022 | Ma et al. | |
| 2022/0168176 | A1* | 6/2022 | Coleman | A61H 23/0263 |

* cited by examiner

*Primary Examiner* — Rachel T Sippel
*Assistant Examiner* — Jacqueline M Pinderski
(74) *Attorney, Agent, or Firm* — Erise IP, P.A.

(57) ABSTRACT

Systems, apparatuses, and methods for end effectors having an aperture are disclosed. An end effector may be driven by a reciprocating driver that drives the end effector in a reciprocating manner. The end effector may have an aperture therethrough and may be formed from a flexible high rebound material. When driven, the end effector may transfer energy from the reciprocating driver to a target treatment area on a recipient for therapeutic purposes. Energy may pass from the reciprocating driver and be temporarily stored within the end effector before being released and imparted to the target treatment area. The end effector may contract about the aperture and rebound to deliver the energy.

20 Claims, 13 Drawing Sheets

FLEXIBLE END EFFECTORS WITH AN APERTURE

TECHNICAL FIELD

Embodiments of the present disclosure generally relate to systems and apparatus for inducing physical therapy treatments on an individual. More specifically, embodiments of the present disclosure relate to end effectors for therapeutic devices.

RELATED ART

Therapeutic massage devices are often used to provide therapeutic benefits to a recipient. Massage devices generally fall into two categories: percussive and vibrational. Percussive massage devices utilize a reciprocating striking force that is imparted on the recipient. The percussive force can increase blood flow to a target area, among other benefits. Vibrational massagers utilize vibrations to massage a target area. Many massage devices are handheld and portable such that a person can use the device on themselves without requiring a professional or other person to operate the device.

Percussive massage devices have attachments or end effectors that are driven (often, by a reciprocating driver) to repeatedly impact the end effector to a target treatment area on the recipient. These end effectors are generally formed of a relatively hard plastic or metal and generally have a contact point formed as a relatively sharp tip. Improper use of these devices can therefore lead to injury to the recipient due to the hardness of the end effector and the high speed at which the percussive massage devices operate. Additionally, because of the hardness of the end effector material and the speed at which the percussive devices operate, percussive massage devices cannot be safely used on more sensitive areas of the body, such as the face or the stomach areas. Further, it is often difficult to attenuate or effectively control the energy transfer for these end effectors to target various regions of the body. That is, each end effector generally has a single contact point or region with which the end effector is designed to impact the target treatment area. Thus, each end effector is a single purpose end effector, and targeting different treatment areas requires different end effectors.

Other percussive massage devices provide end effectors formed from softer materials, such as foam, that are designed to absorb and deflect vibrational energy over a larger area of impact as compared to the stiff end effectors described above. Softer end effectors are prone to high energy losses in transferring energy from the driving device to the target treatment area. Furthermore, the larger size of the softer end effectors precludes them from targeting smaller regions of the body. Improvements in end effectors are needed.

General massage and other therapeutic techniques may fail to efficiently treat certain regions of the human body. Further, such techniques generally require direct application of force to the target treatment area. What is needed are improved therapeutic devices that can more effectively target different areas. Further, what is needed are therapeutics that can target and provide therapeutic treatment to a target treatment area without requiring direct contact between the therapeutic device and the target treatment area.

SUMMARY

Embodiments of the present disclosure address the above-identified needs by providing systems, apparatuses, and methods for end effectors having an aperture. The end effector may comprise a generally flexible material (e.g., an elastomer) that is formed with an aperture therethrough. When driven by a reciprocating driver (such as a massage gun) or other type of driver, the end effector may contract about the aperture, storing energy within the end effector, and then rebound to expel the stored force. The end effector may be held against or proximal to a target treatment area on a recipient to deliver the force from the rebound to the recipient.

In some embodiments, the techniques described herein relate to an end effector assembly for therapeutics, including: an end effector having a proximal end and a distal end, including: an attachment portion at the proximal end, the attachment portion configured to couple the end effector assembly to a reciprocating therapeutic device; and a toroidal contact portion extending from the attachment portion, the toroidal contact portion defining at least one aperture, wherein a ratio of a width of the at least one aperture to an outer width of the toroidal contact portion is at least 0.33, and wherein when driven by the reciprocating therapeutic device, the end effector contracts and rebounds about the at least one aperture to transfer energy to a target treatment area in contact with the end effector; and an internal support structure received at least partially within the end effector at the proximal end.

In some embodiments, the techniques described herein relate to an end effector assembly, further including a connector coupled to the attachment portion at a first end and to the reciprocating therapeutic device at a second end.

In some embodiments, the techniques described herein relate to an end effector assembly, wherein the end effector is formed from a first material, wherein the internal support structure is formed from a second material having a greater hardness than the first material, wherein the first material is an elastomer, and wherein the second material includes one of: a carbon fiber or a thermoplastic.

In some embodiments, the techniques described herein relate to an end effector assembly, wherein the toroidal contact portion includes a first cross-sectional area and the internal support structure includes a second cross-sectional area, and wherein the second cross-sectional area is in a range of 10% to 50% of the first cross-sectional area.

In some embodiments, the techniques described herein relate to an end effector assembly, wherein the internal support structure includes a first perimeter that is at least 20% of a second perimeter of the toroidal contact portion.

In some embodiments, the techniques described herein relate to an end effector assembly, wherein the end effector includes a material having a coefficient of restitution in a range of 0.8 to 0.85, and wherein the material includes a hardness in a range of 50 Shore A to 75 Shore D.

In some embodiments, the techniques described herein relate to an end effector assembly, wherein the at least one aperture includes a first aperture and a second aperture, wherein the first aperture is proximal to the distal end and the second aperture is proximal to the proximal end, and wherein a ratio of a first area of the first aperture to a second area of the second aperture is in a range of 1.5 to 3.

In some embodiments, the techniques described herein relate to an end effector assembly for therapeutics, including: an end effector having a proximal end and a distal end, the end effector including: an attachment portion at the distal end, the attachment portion having a bore extending at least partially along a longitudinal axis of the end effector; a contact portion extending from the attachment portion; an aperture extending through the contact portion, wherein the aperture includes a first width at the proximal end and a second width distinct from the first width at the distal end, and wherein when driven by a reciprocating driver, the end effector contracts and rebounds about the aperture to transfer energy to a target treatment area in contact with the end effector; and a connector having a connector distal end received within the bore and a connector proximal end configured to couple to the reciprocating driver.

In some embodiments, the techniques described herein relate to an end effector assembly, wherein the first width is greater than the second width.

In some embodiments, the techniques described herein relate to an end effector assembly, wherein the second width is greater than the first width.

In some embodiments, the techniques described herein relate to an end effector assembly, wherein the end effector is formed from a first material, and wherein the connector is formed from a second material having a greater hardness than the first material, wherein the first material includes a thermoset polyurethane and the second material includes a thermoplastic polyurethane.

In some embodiments, the techniques described herein relate to an end effector assembly, wherein the end effector includes an elastomer having a Bayshore resilience of at least 40% and a hardness in a range of 50 Shore A to 75 Shore D.

In some embodiments, the techniques described herein relate to an end effector assembly, wherein the end effector and the connector are integral.

In some embodiments, the techniques described herein relate to an end effector assembly for therapeutics, including: an end effector having a proximal end and a distal end, the end effector symmetrical about a longitudinal axis, the end effector including: an attachment portion at the proximal end for coupling to an oscillating driver; and a contact portion extending from the attachment portion, the contact portion configured to contact a target treatment area on a recipient; and at least one aperture extending through the contact portion, wherein when driven by an oscillating driver, the end effector contracts and rebounds about the at least one aperture to transfer energy to the target treatment area in contact with the end effector.

In some embodiments, the techniques described herein relate to an end effector, wherein the at least one aperture includes a first aperture and a second aperture separated by a membrane.

In some embodiments, the techniques described herein relate to an end effector, wherein the end effector includes a material having a coefficient of restitution of at least 0.8.

In some embodiments, the techniques described herein relate to an end effector assembly, further including a connector configured to couple to the attachment portion at a first end and to the oscillating driver at a second end.

In some embodiments, the techniques described herein relate to an end effector assembly, wherein the connector includes a connector first end opposing a connector second end, and wherein the end effector includes an end effector first end opposing an end effector second end, and wherein the connector first end is snap fit to the end effector first end and the connector second end is snap fit to the end effector second end.

In some embodiments, the techniques described herein relate to an end effector assembly, further including an inner support member abutting an inner surface of the contact portion, the inner support member defining a width of the at least one aperture.

In some embodiments, the techniques described herein relate to an end effector assembly, wherein the inner support member includes a first material having a first hardness greater than a second hardness of a second material of the end effector.

This summary is provided to introduce a selection of concepts in a simplified form that are further described below in the detailed description. This summary is not intended to identify key features or essential features of the claimed subject matter, nor is it intended to be used to limit the scope of the claimed subject matter. Other aspects and advantages of the current present disclosure will be apparent from the following detailed description of the embodiments and the accompanying drawing figures.

BRIEF DESCRIPTION OF THE FIGURES

Embodiments of the present disclosure are described in detail below with reference to the attached drawing figures, wherein.

Figure 1:
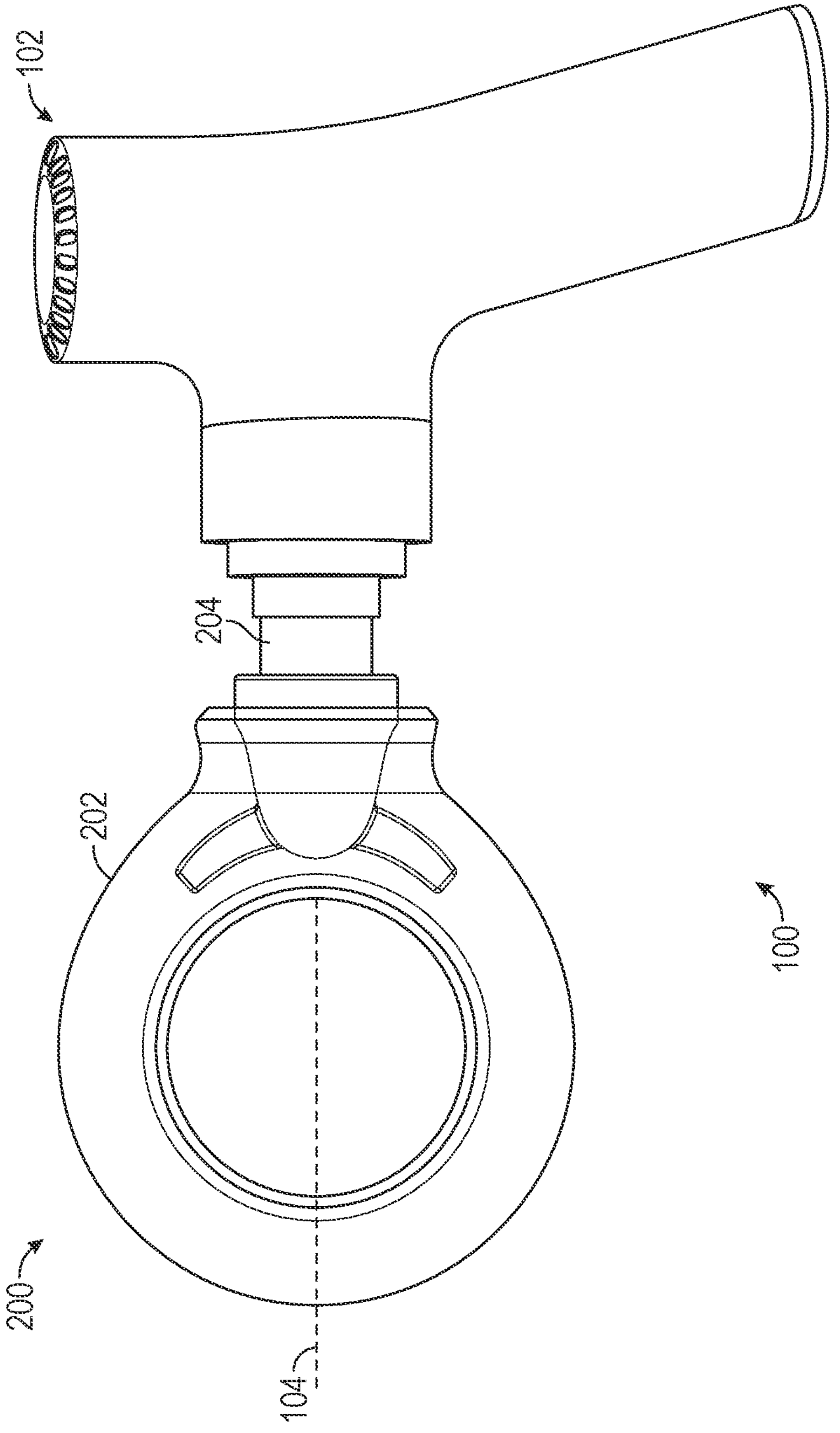
FIG. 1 illustrates a system for some embodiments.

The drawing figures do not limit the present disclosure to the specific embodiments disclosed and described herein.

The drawings are not necessarily to scale, emphasis instead being placed upon clearly illustrating the principles of the present disclosure.

DETAILED DESCRIPTION

The subject matter of the present disclosure is described in detail below to meet statutory requirements; however, the description itself is not intended to limit the scope of claims. Rather, the claimed subject matter might be embodied in other ways to include different steps or combinations of steps similar to the ones described in this document, in conjunction with other present or future technologies. Minor variations from the description below will be understood by one skilled in the art and are intended to be captured within the scope of the claims. Terms should not be interpreted as implying any particular ordering of various steps described unless the order of individual steps is explicitly described.

The following detailed description of embodiments of the present disclosure references the accompanying drawings that illustrate specific embodiments in which the present disclosure can be practiced. The embodiments are intended to describe aspects of the present disclosure in sufficient detail to enable those skilled in the art to practice the present disclosure. Other embodiments can be utilized and changes can be made without departing from the scope of the present disclosure. The following detailed description is, therefore, not to be taken in a limiting sense. The scope of embodiments of the present disclosure is defined only by the appended claims, along with the full scope of equivalents to which such claims are entitled.

In this description, references to "one embodiment," "an embodiment," or "embodiments" mean that the feature or features being referred to are included in at least one embodiment of the technology. Separate reference to "one embodiment" "an embodiment", or "embodiments" in this description do not necessarily refer to the same embodiment and are also not mutually exclusive unless so stated and/or except as will be readily apparent to those skilled in the art from the description. For example, a feature, structure, or act described in one embodiment may also be included in other embodiments but is not necessarily included. Thus, the technology can include a variety of combinations and/or integrations of the embodiments described herein.

Embodiments described herein are generally directed to end effectors having an aperture for therapeutics. The end effectors may be used with therapeutic massage devices, such as a reciprocating therapeutic device, or may be driven by any other type of driver. The end effector may be formed of a flexible material and have one or more apertures therethrough. Additionally, the end effector may have one or more gussets or membranes extending across the aperture (s). The end effector may be formed in a continuous, three-dimensional symmetrical or asymmetrical toroid such that at least one aperture extends through the toroid. The end effector may comprise an attachment portion at a proximal end for coupling to a connector, which, in turn, may couple to the massage device. The end effectors may take various geometries. For example, the end effector may be annular in some embodiments, and in other embodiments, the end effector may be asymmetric, have a plurality of apertures, have one or more support features therein, or any combination thereof.

In operation, the energy output from the driver may be transferred to the end effector and therefrom to the target treatment area, such as the skin, tissue, muscle, etc. of a person (although embodiments of the present disclosure are not limited to use on humans). Due to the aperture, when driven, the end effector may repeatedly compress about the aperture and then rebound back to a nominal position (i.e., the position of the end effector when no input is provided) to transfer the energy to the target treatment area. By compressing or contracting about the aperture, it is meant that at least one of a proximal end of the end effector or the distal end of the aperture may flex towards a center of the aperture. The compression may be along a longitudinal axis of the end effector assembly such that the end effector may elongate laterally (and therefore shorten longitudinally) in the contracted state relative to an uncontracted nominal state. In some embodiments, the aperture is of a sufficient size relative to the size of the end effector to provide the desired contraction and rebound when driven. For example, a ratio of a width of the aperture (i.e., an inner width of the end effector) to an outer width of the end effector may be at least 0.33. The end effectors may be formed of a generally flexible material, (e.g., an elastomer), such that a contact portion of the end effector at least partially deforms against the target treatment area. The end effector material may also be energy efficient (e.g., having a coefficient of restitution of about 80%) to minimize the hysteresis and the loss of energy delivered to the recipient from the therapeutic device.

The end effectors may be used to cause the firing of the Golgi tendon organelles (GTOs) and/or muscle spindle fibers. The rapid firing of the GTOs and/or muscle spindle fibers may be used to treat various ailments on a recipient. As compared to traditional end effectors, the end effectors described herein may be used to treat target areas of a human with less muscular disruption, patient discomfort, and tissue damage. For example, the GTOs and muscle spindle fibers may be fired without causing microtrauma that is common in end effectors formed of harder plastics. Furthermore, the end effectors described herein may more effectively treat sensitive regions of a human without risk of injury. Further still, the end effectors described herein may provide a greater amount of flexibility for the end user in that a single end effector may be able to effectively treat a plurality of regions of the body. Still further, the output delivered by the end effector may be used to treat remote regions of the recipient. For example, an end effector may be applied to the bottom of a person's foot, and the output wave may travel through the person's foot and up into the leg to treat remote regions. Other advantages will be readily apparent to one of skill in the art upon reading the present disclosure.

System Overview

FIG. 1 illustrates a system 100 for some embodiments of the present disclosure. System 100 may comprise a driver 102 and an end effector assembly 200. In some embodiments, the driver 102 is a percussive therapeutic device, also commonly referred to as a massage gun. Percussive therapeutic devices generally comprise a motor that drives a piston in a reciprocating manner. The driver 102 may reciprocate along a reciprocating axis 104, which may coincide with an axis of the end effector assembly 200. Other massage devices and drive types for driving the end effector assemblies described in the present disclosure are within the scope hereof, and embodiments should not be construed as limited to only percussive massage devices. Further still, embodiments of the present disclosure are not limited to being driven by a percussive therapeutic device. Generally, any type of drive system may be used to drive end effector assembly 200. Other types of drivers that may be used with embodiments of the present disclosure include a variable speed oscillation driver, an alternating power driver, a variable frequency driver, an AC motor, a servo motor, a stepper motor, or any other type of drive system. The driver may drive the end effector along a single axis or may be configured to drive the end effector in multiple directions.

Various end effector assemblies 200 that may be used with a driver 102 and used for therapeutic purposes on various body regions are disclosed further hereinafter. The end effector assembly 200 may comprise an end effector 202 that may be coupled to the driver 102 and may be configured to be contacted to a target treatment area to provide a therapeutic effect on the target treatment area. A connector 204 may connect end effector 202 to driver 102. It is one advantage of the present disclosure that the various end effector assemblies described herein may be coupled to various drivers 102. That is, connector 204 may take any configuration to interface with the specific driver 102. It is another advantage of the present disclosure that the end effector assemblies 200 described herein may be more energy efficient than other massage attachments. That is, the end effectors may be formed of a flexible material having a higher storage modulus, coefficient of restitution, etc. than the hard plastics, metals, and other like materials commonly used as massage gun attachments or therapeutic end effectors such that the end effector transfers energy from the driving device to the recipient more efficiently relative to prior end effectors.

The driver 102 may drive the end effector assembly 200 at a given frequency and amplitude. In some embodiments, driver 102 is configured to drive the end effector assembly 200 to reciprocate at a frequency in the range of about 1 Hz to about 20,000 Hz or greater. In some embodiments, driver 102 drives the end effector in the range of about 10 Hz to about 100 Hz or about 10 Hz to about 500 Hz. In some embodiments, driver 102 is configured to ultrasonically drive the end effector, as discussed further below with respect to FIG. 10. In some embodiments, end effector 202 imparts the energy from driver 102 as a wave at a different frequency than the input frequency of driver 102. In some embodiments, the driver 102 is configured to deliver a force to the end effector in the range of about 0.5 lbs to about 100 lbs. Generally, the driver 102 may output any force to the end effector assembly. In some embodiments, driver 102 is configured to operate at an amplitude of about 0.1 inches to about 1 inch. The amplitude is a measurement of the distance that the reciprocating element reciprocates. In some embodiments, driver 102 is configured to operate at an amplitude of about 0.0001 inches to about 0.5 inches. In some embodiments, driver 102 is configured to operate at an amplitude of about 0.0001 inches to about 0.1 inches. It will be appreciated that any combination of the frequency, force, or amplitude may be variable during operation of driver 102. The frequency, force, and/or amplitude may be selected based on the desired treatment area on the recipient. For example, treating the stomach area may require a lower amplitude than treating a more muscular area of the recipient. Driver 102 may operate at various RPMs, such as between about 1500 RPMs to about 4000 RPMs. However, the end effectors described herein may be used with drivers 102 operating at any RPM.

Generally, the end effector assemblies with aperture(s) described herein may take various contours, profiles, shapes, geometries, etc., to alter the output of driver 102 through the end effector. As one example, an end effector having a circular shape with a circular aperture therethrough may produce an output distinct from an output produced by an end effector with a triangular shape and a generally triangular shape. Generally, the end effector may comprise a torus defined by a curve of any function revolved around an axis of revolution. Furthermore, material selection, dimensions, structural inserts, and various other factors may alter the output of the end effector as discussed further hereinafter.

End Effectors with Aperture

Various end effector assemblies are discussed hereinafter. The end effector assemblies may generally comprise an end effector that is coupled to a connector as discussed above. The end effector may be toroidal such that the end effector is formed with at least one aperture. The end effector may take various contours or profiles. The presence of the aperture may cause the end effector to contract about the aperture when driven. As the end effector contracts, energy is stored therein. The end effector may then rebound, and the stored energy may be released as the end effector transitions from the contracted position to the nominal position. As the end effector transitions to the nominal position, the energy may be transferred to the target treatment area. In some embodiments, the energy is transferred as a mechanical wave. The mechanical wave may be a longitudinal or a compression wave such that displacement is parallel to the direction the wave travels.

During operation, the end effector may be configured to be held in contact with a recipient. That is, as driver 102 reciprocates, the user operating driver 102 may maintain contact of at least a portion of end effector assembly 200 with the recipient. Such operation, where contact portion 208 maintains contact with the target treatment area may be referred to as compressive operation. In some embodiments, system 100 is operated percussively such that end effector 202 repeatedly impacts the recipient, and the end effector 202 does not contact the recipient between successive impacts. It will be appreciated that, during operation, the user may adjust the position of driver 102 to alternate between compressive operation and percussive operation.

Figure 2B:
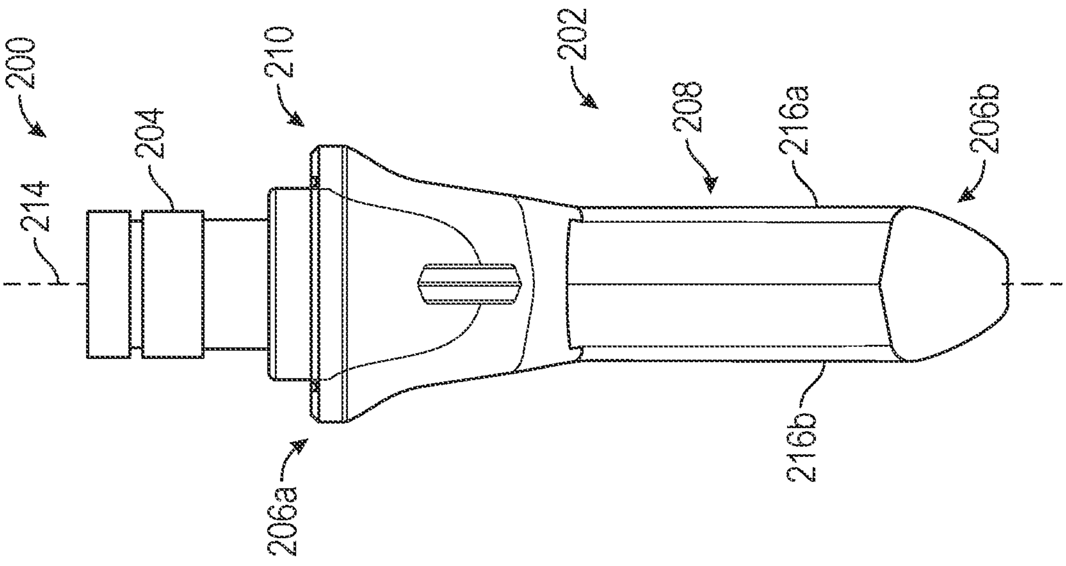
FIG. 2B illustrates a side view of the first end effector assembly for some embodiments.
Figure 2A:
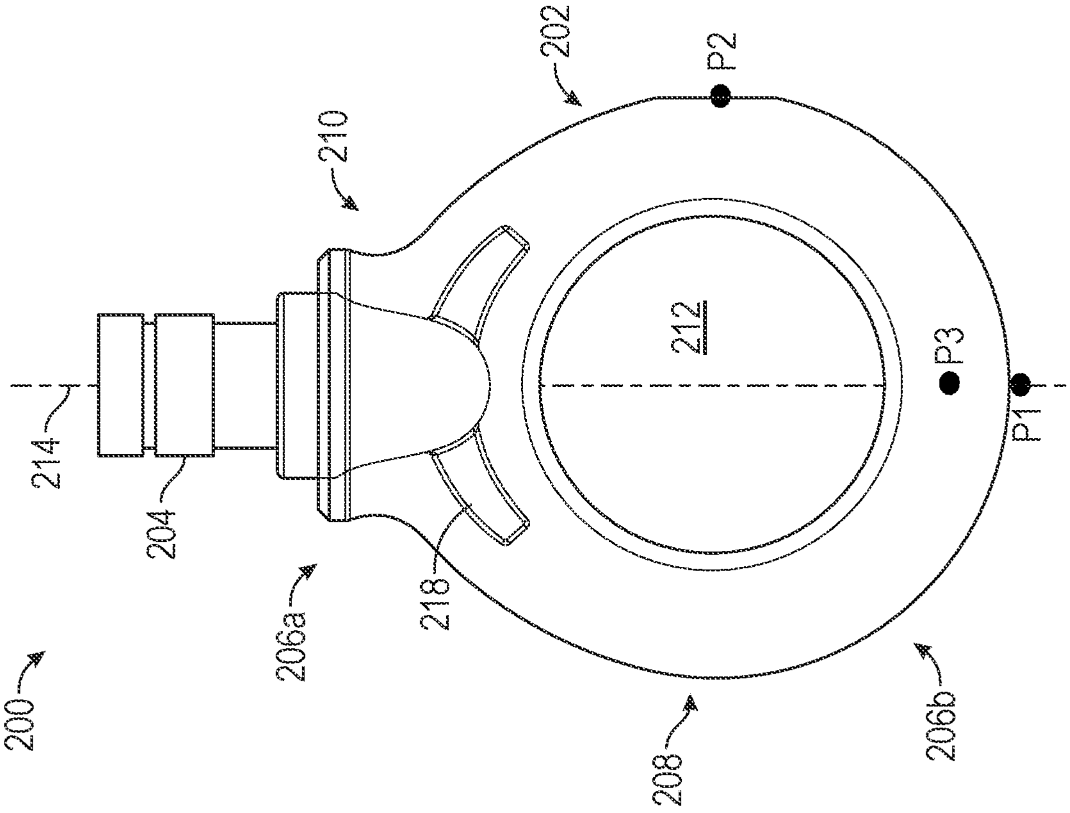
FIG. 2A illustrates a front view of a first end effector assembly for some embodiments.

FIGS. 2A and 2B illustrate a front, planar view and a side, planar view, respectively, of end effector assembly 200 for some embodiments of the present disclosure. Connector 204 may connect end effector 202 to driver 102 as discussed above. In some embodiments, end effector 202 forms a friction fit with connector 204. Thus, end effector 202 may be easily removed from connector 204. The friction fit may be such that end effector 202 is retained on connector 204 when driver 102 drives end effector assembly 200, while the end user may be able to pull end effector 202 to overcome the friction force. End effector 202 may comprise a proximal end **206*a*, a distal end 206*b*, a contact portion 208, and an attachment portion 210. End effector 202 may be toroidal, defining an aperture 212 therethrough. As shown, end effector 202** comprises an annular torus. Other toroid shapes are discussed further below.

Attachment portion 210 may be located at proximal end **206*a*. In some embodiments, attachment portion 210 comprises a bore extending at least partially therethrough. The bore may be open at proximal end 206*a* and may be configured to receive connector 204 therein. The bore may extend along a longitudinal axis 214 of end effector assembly 200. In some embodiments, the bore extends entirely through attachment portion 210, and connector 204 may extend through attachment portion 210 and partially into aperture 212. In some embodiments, the bore does not extend entirely through attachment portion 210, and connector 204 extends within but not entirely through attachment portion 210. In some embodiments, end effector 202 is rotatable about connector 204. Accordingly, end effector 202** may be rotated about connector 204 to adjust an angle of end effector 202 relative to driver 102. For example, end effector 202 may be rotated 90 degrees relative to the position shown in FIG. 2A to provide the end user a different orientation at which to treat the target treatment area.

Contact portion 208 extends from attachment portion 210. Contact portion 208 may form a generally annular or toroidal shape in some embodiments. Contact portion 208 may take other geometries as discussed further below. As used herein, contact portion 208 may include any portion of end effector 202 that may be contacted to the target treatment area on the recipient. Thus, in some embodiments, contact portion 208 may include portions of attachment portion 210. As used herein, attachment portion 210 may include the region of end effector 202 that is configured to receive connector 204 therein, and attachment portion 210 may have a distinct geometry from contact portion 208. For example, contact portion 208 of end effector 202 has a generally annular shape, while attachment portion 210 is rectangular.

It is one advantage of the present disclosure that contact portion 208 may comprise substantially the entire exterior surface of contact portion 208 for impacting the target treatment area for therapeutic purposes. In contrast, typical therapeutic devices include end effectors with a single or a limited subset of contact points for treating the target treatment area. For example, traditional attachments generally have a single contact point or area on a distalmost point of the attachment that is configured to strike a target treatment area. Contacting other surfaces of such attachments results in ineffectual treatment to the recipient due to the material of such attachments and the lack of an aperture. That is, contacting these points to the recipient may result in an ineffectual amount of force transferred from the driver to the recipient. By contrast, by forming end effector 202 with aperture 212 and with an energy efficient material (discussed further below), contact portion 208 may include a large portion of the overall outer surface area of end effector 202 (e.g., at least 50% and up to 100%) that, when contacted to the recipient, may effectively transfer energy from driver 102 to the target area.

For example, point P1 may represent a first contact point on contact portion 208 for treating a target treatment area. Point P1 may be coaxial with longitudinal axis 214 and/or coplanar with longitudinal axis 214, along which the force from driver 102 may be directed and may represent the highest force output of end effector 202. While illustrated as a single point, it will be appreciated that point P1 may generally represent the area surrounding point P1 that contacts the recipient. When end effector assembly 200 is driven by driver 102, energy is transferred from driver 102 to connector 204 and from connector 204 to end effector 202. Due to aperture 212 and the material of end effector 202, end effector 202 may function similar to a spring (e.g., a garter spring) and repeatedly contract and rebound as the driver 102 reciprocates. As end effector 202 contracts, energy from driver 102 is temporarily stored in the end effector 202 and, as the end effector 202 rebounds and returns to a nominal position, the stored energy is expelled, and a corresponding force may be delivered along the rebound direction(s). Because of the aperture 212, end effector 202 may direct the rebound force in a plurality of directions corresponding to the geometry of aperture 212 such that a plurality of points and/or regions on the exterior of end effector 202 can be contacted to the recipient to deliver a force. For example, for a circular aperture 212, the force may be directed radially outward. Accordingly, the energy from driver 102 may then be transferred to the recipient via point P1. Contact portion 208 may be flexible and deform when contacting the recipient such that contact portion 208 at least partially conforms to the shape of the target treatment area. For example, if point P1 is contacting the heel of a person, point P1 may flex and conform to the shape of the heel.

The operator of the end effector 202 can direct the energy by manipulating the orientation of the driver 102. Accordingly, the operator may be able to adjust the force output by adjusting the orientation of the end effector 202. It is one advantage of the present disclosure that an operator may only apply a very light amount of force of end effector 202 into the recipient to generate a large amount of force output that can be used for therapeutic purposes as discussed herein. That is, the outer surface of end effector 202 may only need to be in contact with or lightly pressing into the recipient to provide an output that may stimulate the GTOs and spindle fibers because of the force delivered by the rebound of end effector 202 as discussed above.

Points P2 and P3 illustrate how the orientation of end effector 202 may be manipulated to adjust the output of end effector 202. Both P2 and P3, similar to P1, may be contacted to the recipient to deliver energy from driver 102 to the recipient. Because end effector 202 may contract when driven, a rebound or restoring force is generated in a plurality of directions as end effector 202 is restored to the nominal state. In contrast, solid end effectors do not contract and, as such, no rebound force is generated. Accordingly, energy for such solid end effectors may only be directed along the reciprocating axis 104 while the end effectors of embodiments herein may direct energy in a plurality of directions when rebounding from the contracted state. Thus, the end effector assembly 200 of embodiments herein provides an end effector with greater flexibility of use for the end user as compared to other massage attachments. For example, driver 102 may be oriented to position end effector assembly 200 such that P2 is perpendicular to the recipient. In such an orientation, there is a parallel offset between where the force from driver 102 is directed (i.e., along longitudinal axis 214) and the point P2. However, due to the presence of aperture 212, along with the material properties of end effector 202, end effector assembly 200 may be used in such an orientation while still imparting energy from driver 102 to the target treatment area.

Likewise, point P3, located on a front surface of contact portion 208 in a plane perpendicular to that of P1, may be contacted to the recipient, with energy being transferred from driver 102 to the target treatment area at this orientation. It will be appreciated that using end effector assembly 200 at orientations that are not coaxial or coplanar with reciprocating axis 104 may result in less force transferred to the recipient than contacting points that are coaxial and/or coplanar to the recipient. However, this may be advantageous as embodiments of the present disclosure therefore provide a single end effector assembly 200 that can be used to generate various force outputs that are adjustable by adjusting the orientation of the end effector assembly 200. For example, a maximum force output of end effector assembly 200 may be obtained by contacting contact point P1 to the recipient, while a lower force output may be obtained by contacting point P2 to the recipient. Thus, unlike traditional attachments for massage devices that have a single contact point, and therefore a single force output for a given input, end effector assembly 200 provides a plurality of contact points for striking a recipient that may generate a plurality of distinct outputs. Further still, the plurality of orientations at which end effector assembly 200 may be operated provides advantages in reaching difficult to reach areas. For example, it may be easier and/or more comfortable for a user to massage their back by contacting point P3 to their back rather than point P1. That is, it may be difficult for the user to reach behind themselves and hold and operate driver 102 to strike P1 to their back. However, reaching driver 102 behind their back to contact P3 to their back may be an easier orientation at which to hold driver 102. By contrast, in traditional end effectors, a different end effector may need to be used entirely to allow the user to massage their back at the orientation that may be used to contact P3 to the user. As another example, it is contemplated that aperture 212 may receive a body part therein, (e.g., a foot) and the outer surfaces of aperture 212 may contact the recipient (e.g., to massage all sides of the ankle simultaneously). As another example, orienting the end effector 202 to contact the recipient with P1 may be used to cause rapid contraction and relaxation of the muscle spindle fibers (e.g., one contraction/relaxation per oscillation of driver 102), and P2 or P3 may be used to impart less energy for a softer impact and may be used for myofascial release, as one example. Thus, a single end effector 202 may be used for various treatments that may require different force applications.

As previously discussed, end effector 202 may take various geometries and dimensions without departing from the scope hereof. In some embodiments, end effector 202 comprises a depth (measured from a front face **216*a* to a back face 216*b*) that varies along longitudinal axis 214. In some embodiments, end effector 202 has a first, largest depth at attachment portion 210, a second, smaller depth distally from attachment portion 210, and a third, smallest depth at distal end 206*b*. In other embodiments, the depth of end effector 202 between attachment portion 210 and distal end 206*b* is the smallest depth. Providing a wider depth at distal end 206*b*, where end effector 202 may be used to impact a recipient, may provide a larger surface area of contact portion 208 to impact the recipient. Thus, the energy may be dispersed over a wider surface area, which may be useful in treating more sensitive treatment areas. In some embodiments, end effector 202 comprises a uniform depth. In some embodiments, end effector 202 comprises a largest depth at distal end 206*b***.

In some embodiments, the depth of distal end **206*b* is in the range of 0.5 inches to about 1.5 inches. In some embodiments, the depth of distal end 206*b* is about 0.8 inches. In some embodiments, end effector 202 comprises an outer diameter of about 0.5 inches to about 12 inches. In some embodiments, end effector 202 comprises an outer diameter of about 2.5 inches. In some embodiments, end effector 202 comprises an inner diameter (defining an outer diameter of aperture 212) of about 0.3 inches to about 8 inches. In some embodiments, the ratio of the inner diameter of end effector 202 to the outer diameter is in the range of about 25% to about 75%. In some embodiments, the ratio of the inner diameter to the outer diameter is about 30%, about 40%, about 50%, about 60%, or greater than about 70%, or at least 20%. In some embodiments, end effector 202 comprises a height measured from distal end 206*b* to proximal end 206*a* of about 2.5 inches. It will be appreciated that the dimensions of end effector 202 may scale with the input (e.g., amplitude, frequency, motor power, etc.) of driver 102**.

End effector 202 may be formed of a generally flexible material such that end effector 202 can contract and rebound when driven by driver 102 as previously discussed. Further, the generally flexible material may allow end effector 202 to deform and/or conform about the target treatment area. In some embodiments, end effector 202 comprises an elastomer. In some embodiments, end effector 202 is formed from a polyurethane, such as a thermoset polyurethane. In some embodiments, end effector 202 is formed from a rubber, a silicone rubber, or the like. Other exemplary materials are discussed further hereinafter. In some embodiments, end effector 202 comprises a material having a Bayshore resilience of at least 40%. End effector 202 may comprise a material having a Bayshore resilience of 40% or less without departing from the scope hereof. In some embodiments, end effector 202 comprises a hardness value in the range of 50 Shore A to 75 Shore D. In some embodiments, end effector 202 comprises a material having a coefficient of restitution of at least 0.7. The end effector 202 may have a vibration velocity of about 25 ft/sec or less. In some embodiments, end effector 202 is formed from a material having a coefficient of restitution in the range of about 0.8 to about 0.85. Providing end effectors with coefficients of restitution in these ranges may be advantageous in generating the output as such materials can significantly rebound when driven by a driver 102. In contrast, materials with lower coefficients of restitution may lose too much energy from driver 102 to effectively treat the target treatment area. In some embodiments, end effector 202 comprises a flexible material having a flexural modulus of about 10 kPsi to about 100 kPsi.

Connector 204 may have an opening 226 (see FIG. 3B) at a proximal end thereof for coupling to driver 102. Connector 204 may be a cylindrical or bullet-shaped member. Generally, connector 204 may take any shape or otherwise be configured to interface with driver 102. Connector 204 may comprise a recess or the like for retaining end effector 202 such that end effector 202 has common movement with connector 204. In some embodiments, end effector 202 and connector 204 are formed as an integral unit.

Connector 204 may be formed of a stiffer material than end effector 202. In some embodiments, connector 204 comprises a plastic or a metal. In some embodiments, connector 204 comprises aluminum or alloys thereof. In some embodiments, connector 204 comprises a steel. In some embodiments, connector 204 comprises a thermoplastic polyurethane (TPU). In some embodiments, connector 204 comprises 70 Shore D TPU that is bonded to a polyurethane end effector 202. In some embodiments, connector 204 comprises a carbon fiber and/or a carbon fiber additive. In some embodiments, connector 204 comprises a fiberglass and/or a fiberglass additive. In some embodiments, connector 204 comprises polytetrafluorethylene (PTFE), or other similar per- and polyfluoroalkyl substances. In some embodiments, connector 204 comprises material having a flex modulus of about 100 kPsi to about 900 kPsi.

Figure 2D:
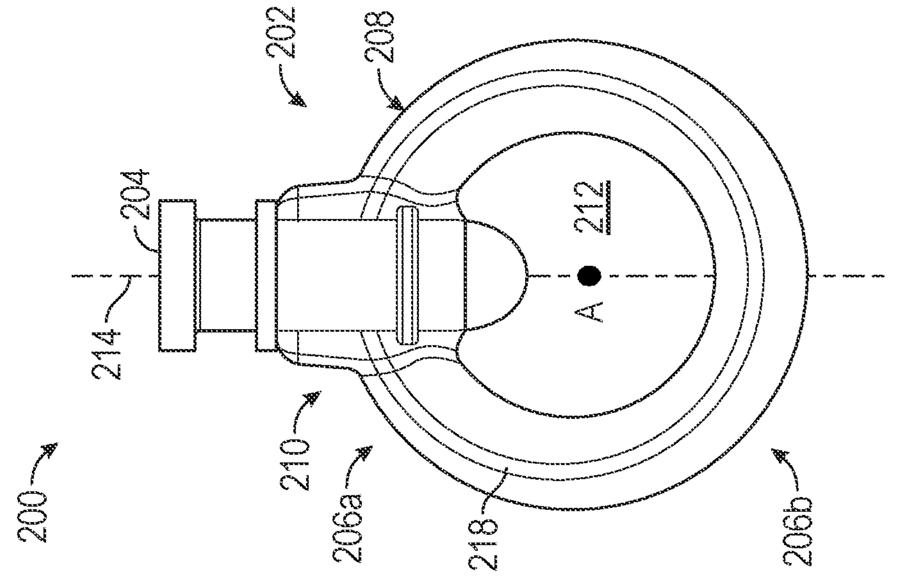
FIG. 2D illustrates the first end effector assembly with a first internal support structure for some embodiments.
Figure 2C:
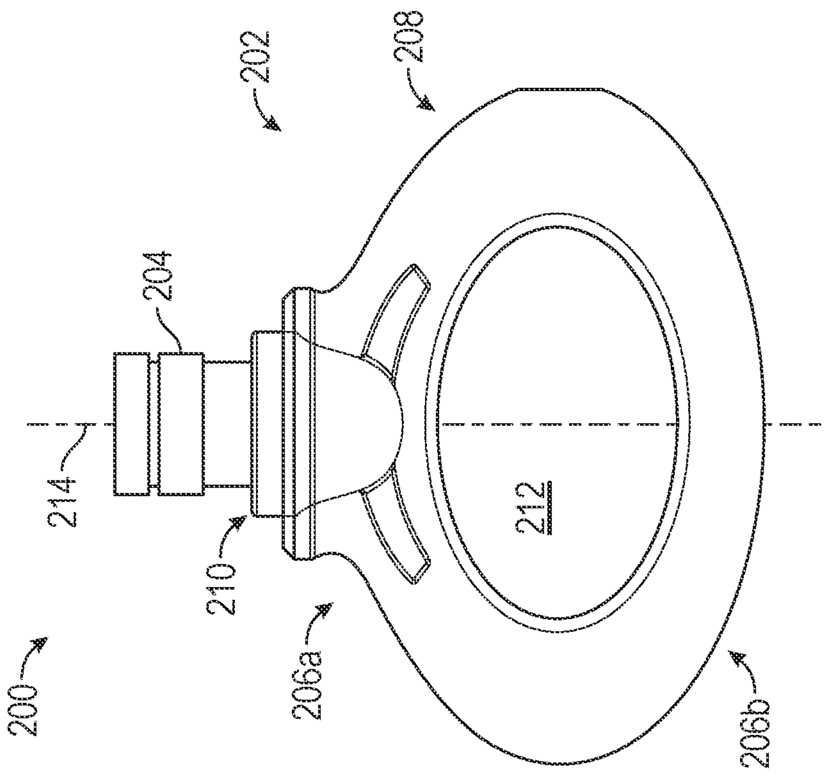
FIG. 2C illustrates the first end effector assembly in a compressed state for some embodiments.

FIG. 2C illustrates end effector assembly 200 with end effector 202 in a compressed state for some embodiments of the present disclosure. As shown, end effector 202 has contracted about the aperture 212 such that end effector 202 is elongated laterally and shortened longitudinally, and aperture 212 presents a more ovular shape as compared to the circular shape of aperture 212 in the nominal state of end effector 202 depicted in FIG. 2A. Thus, in some embodiments, end effector 202 may be considered as contracting about the longitudinal axis 214 or about reciprocating axis 104. However, in some embodiments, the end effector may be configured to contract about a lateral axis such that end effector 202 elongates vertically and shortens laterally. In the case where distal end **206*b* is contacted to the recipient, distal end 206*b* may structurally deform to thereby conform to the shape of the recipient as previously discussed. Additionally, because end effector 202 may be held in contact with the recipient during use, proximal end 206*a* may contract towards distal end 206***b*, while distal end 206*b* may contract less due to the contact with the recipient. Thus, in some embodiments, when driven, the displacement of proximal end 206*a* is greater than the displacement of distal end 206*b*. Generally, the displacement of end effector 202 may be smallest proximal to the region that is in contact with the target treatment area.

Along with the materials and presence of aperture 212, end effector assembly 200 may include various other components configured to adjust the output of an end effector 202. In some embodiments, end effector assembly 200 may also comprise an internal support structure 218 disposed within end effector 202. Internal support structure 218 may comprise a material having a higher stiffness and/or hardness than the material of end effector 202. Providing internal support structure 218 with a higher stiffness and/or hardness material than end effector 202 may effectively increase the rigidity of end effector 202 such that less energy may be lost from driver 102 to the target treatment area. Furthermore, the addition of internal support structure 218 may increase the rigidity of end effector assembly 200, which may reduce energy losses. The effect of the internal structure (or an inner support, discussed further below) may be localized within end effector 202. That is, placing an internal structure near proximal end 206*a* may reduce the vibration, energy loss, flexure, or any combination thereof at the proximal end, while distal end 206*b* may have greater flexure and/or structural deflection.

In some embodiments, internal support structure 218 extends from a distal end of connector 204. In some embodiments, internal support structure 218 extends partially within end effector 202. In some embodiments, as shown in FIG. 2C, internal support structure 218 may extend fully within internal support structure 218. That is, internal support structure 218 may be generally annular or toroidal and concentric with aperture 212. Internal support structure 218 may have a curvature and/or geometry that mirrors a curvature and/or geometry of contact portion 208. For example, as shown, end effector 202 has a generally circular shape. Accordingly, internal support structure 218 may be formed with a circular shape corresponding to that of end effector 202. As another example, end effector 502 (discussed below with respect to FIG. 5) has a generally triangular shape; accordingly, an internal support structure 218 used with end effector 502 may have a corresponding triangular shape. It will be appreciated that the cross-section of internal support structure 218 may not match the shape of end effector 202. For example, internal support structure 218 may be formed with a rectangular cross-section, while end effector 202 may have a circular cross-section. The cross-section of internal support structure 218 may also vary throughout end effector 202.

In some embodiments, internal support structure 218 is formed integrally with connector 204. In some embodiments, connector 204 is configured to receive and/or couple to internal support structure 218. For example, connector 204 may comprise a lateral bore at a distal end thereof for receiving internal support structure 218 therethrough. As another example, internal support structure 218 may be two distinct pieces that couple to two distinct attachment points on connector 204. It is contemplated that internal support structure 218 may comprise one or more pieces. For example, internal support structure 218 may be modular such that the user can extend or reduce the size of internal support structure 218 within end effector 202 as desired. In some embodiments, end effector 202 is overmolded onto connector 204 and/or internal support structure 218. In some embodiments, end effector 202 is formed with an opening for inserting internal support structure 218 therein.

FIG. 2D illustrates end effector assembly 200 having an internal support structure 218 extending fully within contact portion 208. Internal support structure 218 may share an axis of revolution (e.g., an axis A going through a center point of aperture 212 and orthogonal to longitudinal axis 214, i.e., into the paper as viewed in FIG. 2D) with contact portion 208. In some embodiments, internal support structure 218 is fully revolved around the axis of revolution A. In other embodiments, for example as shown in FIG. 2A, internal support structure 218 may only be revolved partially around the axis of revolution. In some embodiments, internal support structure 218 is revolved around the shared axis of revolution in the range of 20% to 100% of the full rotation. In some embodiments, internal support structure 218 is revolved about the axis of revolution about 20% to about 100% around the axis of revolution. Revolving internal support structure 218 100% around the axis of revolution forms a closed internal support structure 218 as opposed to the open internal support structure 218 shown in FIG. 2A. To state another way, internal support structure 218 may have a perimeter (e.g., as measured along an outermost surface thereof) that is in the range of 20% to 100% of the range of the perimeter of end effector 202 (e.g., as measured along an outermost surface thereof).

As discussed above, the addition of internal support structure 218 may adjust the performance of end effector 202, thereby changing the delivered wave to the recipient. As a stiffer and/or harder material is added within end effector 202 and the rigidity of end effector 202 increases, the energy lost from driver 102 to the recipient may decrease. Accordingly, as the size (e.g., length, width, depth) of internal support structure 218 increases, a greater force output may be delivered to the recipient relative to smaller size internal support structures 218. In some embodiments, internal support structure 218 has a generally constant cross-sectional area. In some embodiments, internal support structure 218 has a varying cross-sectional area. For example, internal support structure 218 may have a greater cross section near distal end 206*b* and proximal end 206*a*, and a smaller cross section therebetween.

In some embodiments, internal support structure 218 comprises a cross-sectional area that is about 5% to about 50% of the cross-sectional area of end effector 202. In some embodiments, the internal support structure 218 comprises a cross-sectional area that is about 10% to about 50% of the cross-sectional area of end effector 202. In some embodiments, internal support structure 218 has a cross-sectional area that is about 20% to about 40% of a cross-sectional area of end effector 202. In some embodiments, the cross-section of internal support structure 218 is circular. In some embodiments, the cross-section section of internal support structure 218 is rectangular, trapezoidal, or any other shape. In some embodiments, the cross-section of internal support structure 218 is rectangular having a width that is about 2-5× the height of the rectangle. In some embodiments, the cross-section of internal support structure 218 is rectangular having a width about 3× the height. Generally, internal support structure 218 may have a profile of any contour.

In some embodiments, internal support structure 218 comprises a carbon fiber. In some embodiments, internal support structure 218 comprises a fiber glass and/or a carbon fiber additive. In some embodiments, internal support structure 218 comprises a thermoplastic elastomer. In some embodiments, internal support structure 218 comprises a polyether block amide (PEBA) having a Shore hardness in the range of 50 Shore D to 75 Shore D. For example, the material may be PEBAX®. In some embodiments, the internal support structure 218 comprises a thermoplastic polyurethane. In some embodiments, the internal support structure 218 comprises a TPU having a hardness of about 85 Shore A to about 95 Shore A.

Figure 2F:
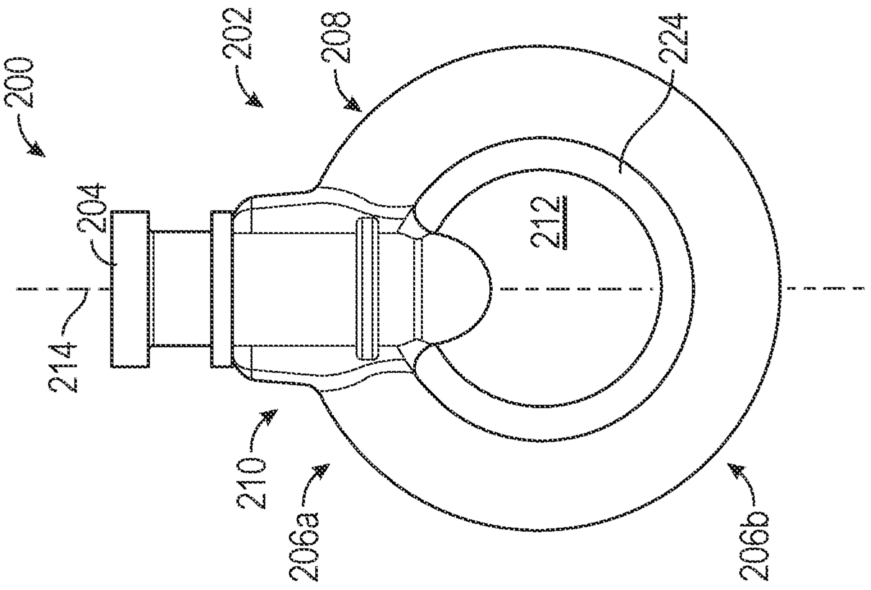
FIG. 2F illustrates the first end effector assembly with an inner support member for some embodiments of the present disclosure.
Figure 2E:
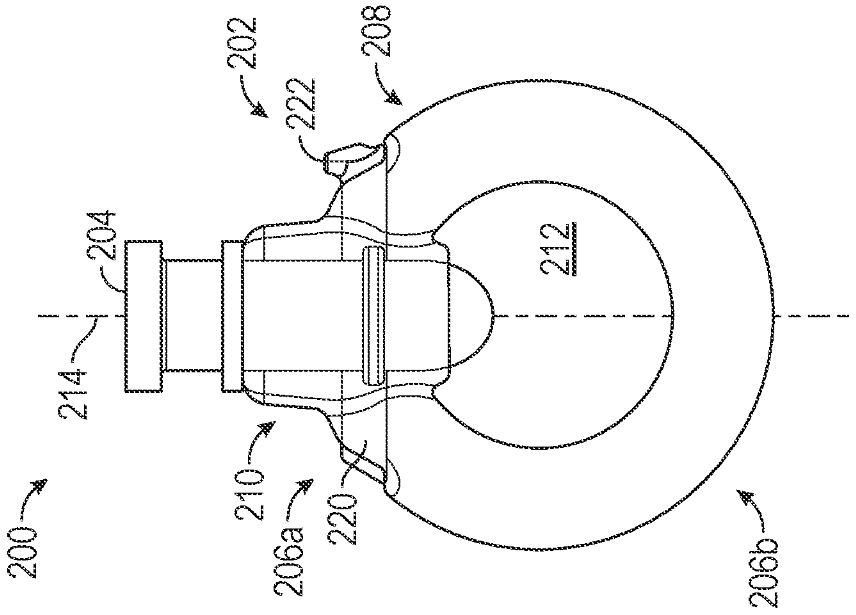
FIG. 2E illustrates the first end effector assembly with second internal support structure for some embodiments of the present disclosure.

FIG. 2E illustrates end effector assembly 200 having an internal support bar 220 for some embodiments of the present disclosure. Internal support bar 220 may be similar to internal support structure 218 but may extend laterally across proximal end 206*a* rather than matching the geometry of contact portion 208. Accordingly, in some embodiments, end effector 202 and/or attachment portion 210 may comprise a bore for receiving internal support bar 220 therein. The bore may extend substantially laterally and may be configured such that internal support bar 220 is slidably receivable within end effector assembly 200. In some embodiments, internal support bar 220 comprises a nub 222 on one end that provides a gripping point for a user to grasp internal support bar 220 for insertion and removal thereof. Therefore, the user may easily change between different internal support bars 220 having different material properties to adjust the output of end effector assembly 200. For example, if the user wishes to generate a larger force output, the user may change to an internal support bar 220 having a higher hardness and/or stiffness. Similarly, if the user wishes to generate a less concentrated output (e.g., having less force applied to the same area with the same input from driver 102), the user may change to an internal support bar 220 having a lower hardness and/or stiffness or remove internal support structure 218 from end effector assembly 200 entirely. In some embodiments, internal support bar 220 is configured as a leaf spring. Internal support bar 220 may comprise any of the materials described with respect to internal support structure 218 or connector 204.

Turning now to FIG. 2F, end effector assembly 200 is illustrated with an inner support 224 for some embodiments of the present disclosure. Inner support 224, similar to internal support structure 218 and internal support bar 220 discussed above, may be formed of a more rigid material than end effector 202 to adjust the output of end effector assembly 200. Rather than being disposed within end effector 202, inner support 224 may instead abut an inner surface of end effector 202. Inner support 224 may be concentric with contact portion 208. Generally, inner support 224 may have a geometry matching that of aperture 212. In some embodiments, an outer diameter or width of inner support 224 is equivalent or substantially equivalent to an inner diameter or width of contact portion 208. Like internal support structure 218, inner support 224 may be a solid of revolution revolved around the same revolution axis A as end effector 202. In some embodiments, inner support 224 is revolved 100% around the axis. In some embodiments, inner support 224 is partially revolved around the axis.

In some embodiments, connector 204 is configured to extend through attachment portion 210 and partially into aperture 212 as shown in FIG. 2E. In some such embodiments, connector 204 may be formed with an opening for receiving inner support 224 therein to couple inner support 224 to end effector assembly 200. In some embodiments, an inner surface of end effector 202 is formed with a groove such that inner support 224 may be snap fit or frictionally fit with end effector 202.

In some embodiments, inner support 224 comprises an inner diameter of about 20 mm to about 40 mm. In some embodiments, inner support 224 comprises an inner diameter of about 30 mm. The inner diameter of inner support 224 may define the outer diameter of aperture 212. In some embodiments, inner support 224 comprises an outer diameter of about 30 mm to about 60 mm. In some embodiments, inner support 224 comprises an outer diameter of about 50 mm. Other diameters are within the scope hereof. Inner support 224 may be formed with any of the materials described above with respect to connector 204, internal support structure 218, or internal support bar 220. Generally, inner support 224 may comprise a material having a higher stiffness than that of end effector 202. In some embodiments, connector 204 and the internal support structure (i.e., internal support structure 218, internal support bar 220, and/or inner support 224) comprise the same material.

It will be appreciated that many variations and combinations of the end effector assembly 200 with above-described internal support structure 218, internal support bar 220, and inner support 224 are within the scope hereof. For example, end effector assembly 200 may comprise both internal support bar 220 and inner support 224. Furthermore, it is contemplated that non-structural components may be used with end effector assembly 200 to adjust the performance thereof. For example, a cloth or other soft material may be placed over or attached to the end effector 202 to dampen the output. Similarly, end effector 202 may be coated with a massage oil or similar lubricant.

Figure 3B:
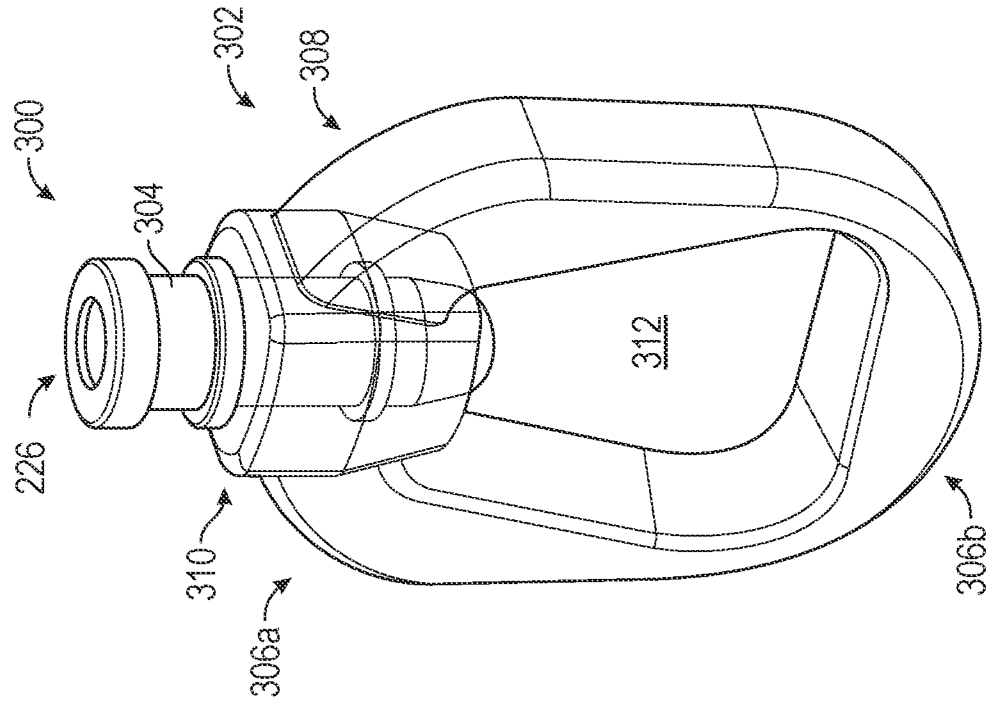
FIG. 3B illustrates a perspective view of the second end effector assembly for some embodiments.
Figure 3A:
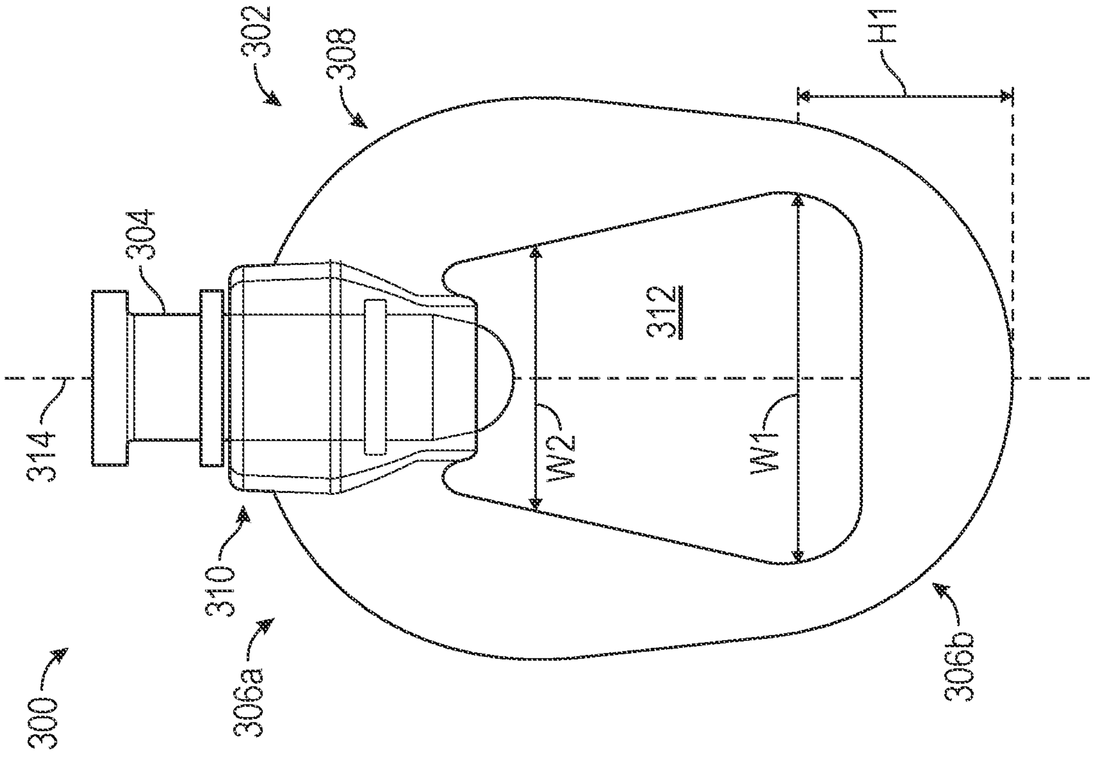
FIG. 3A illustrates a front view of a second end effector assembly for some embodiments.

FIGS. 3A and 3B illustrate a perspective view and a planar view, respectively, of an end effector assembly 300 for some embodiments of the present disclosure. End effector assembly 300 may comprise an end effector 302 and a connector 304. Connector 304 may be substantially similar to connector 204 described above. End effector 302 may comprise a proximal end 306*a* and a distal end 306*b*. End effector 302 may further comprise a contact portion 308 and an attachment portion 310. Connector 304 may couple to end effector 302 at proximal end 306*a* via attachment portion 310, and in turn couple end effector 302 to driver 102.

End effector 302 may define an aperture 312 extending therethrough. Differing from end effector 202 described above, end effector 302 may define an aperture 312 with a variable width along a longitudinal axis 314. For example, aperture 312 may have a first width W1 proximal to distal end 306*a* and a second width W2 proximal to proximal end 306*b*. W2 may be smaller than W1, and the width of aperture 312 may increase along longitudinal axis 314 from proximal end 306*a* to distal end 306*b*. Thus, aperture 312 may present a generally trapezoidal shape. End effector 302 may be symmetrical about longitudinal axis 314.

Figure 3D:
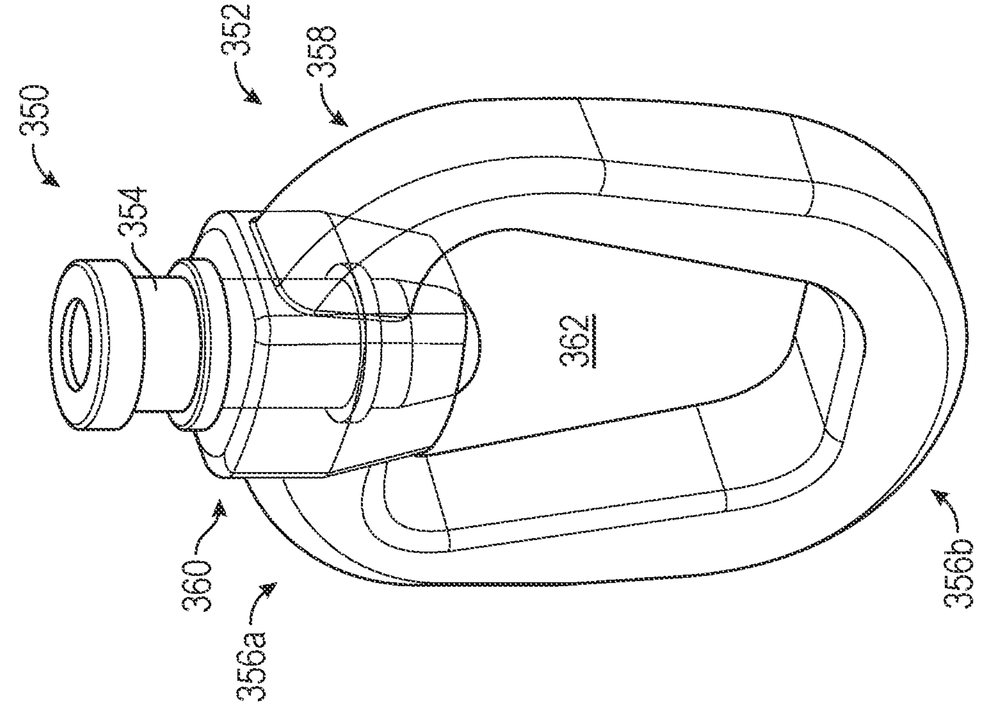
FIG. 3D illustrates a perspective view of the third end effector assembly for some embodiments.
Figure 3C:
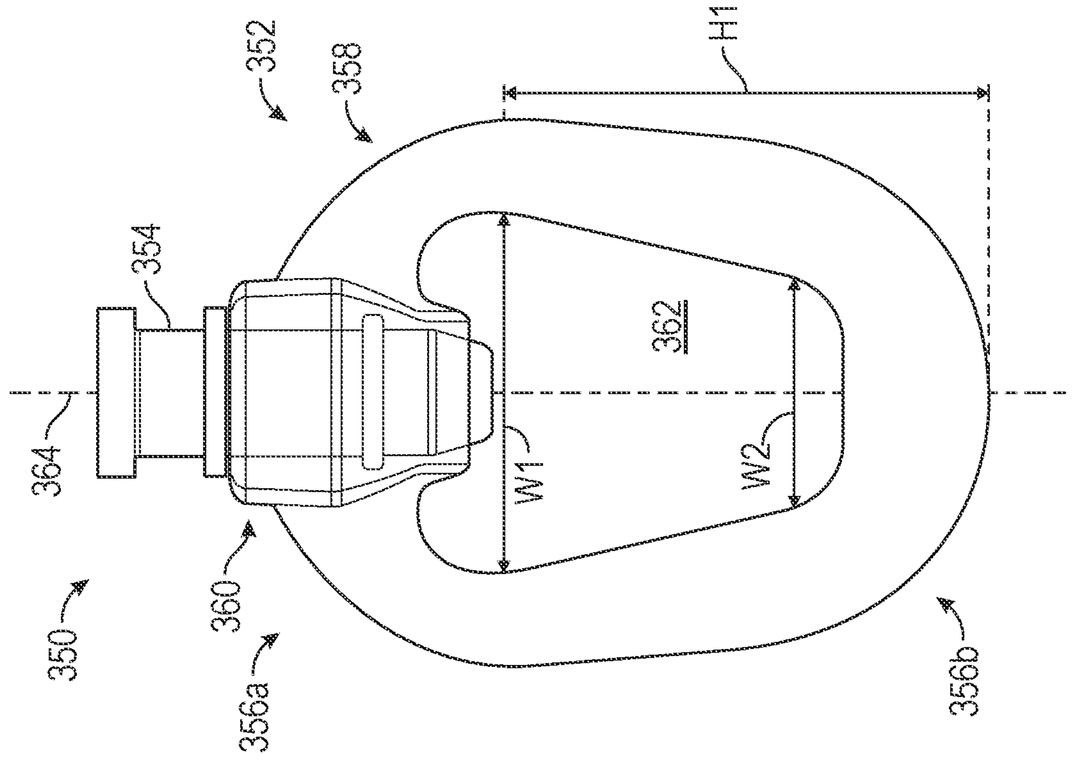
FIG. 3C illustrates a front view of a third end effector assembly for some embodiments.

FIGS. 3C and 3D illustrate a perspective view and a planar view, respectively, of an end effector assembly 350 for some embodiments of the present disclosure. End effector assembly 350 may comprise an end effector 352 and a connector 354. Connector 354 may be substantially similar to connector 204 described above. End effector 352 may comprise a proximal end 356*a* and a distal end 356*b*. End effector 352 may further comprise a contact portion 358 and an attachment portion 360. Connector 354 may couple to end effector 302 at proximal end 356*a* via attachment portion 360.

End effector 352 may define an aperture 362 extending therethrough. Similar to aperture 312 described above, aperture 362 may have a variable width along longitudinal axis 364. Aperture 362 may have a first, longest width W1 proximal to distal end 356*b* and a second, shortest width W2 that is proximal to proximal end 356*a*. Thus, aperture 362 presents an inverse of aperture 312 described above. End effector 352 may be symmetrical about longitudinal axis 364.

Providing an end effector 302, 352 having an aperture 312, 362 that varies in width along a longitudinal axis 314, 364 may provide for the output of the end effector assembly 300, 350 to be adjusted and selected based on the end user's needs. For example, an end effector 352 with an aperture 362 that has a shortest width proximal to distal end 356*b* may provide a stronger force output when contacting the distal end 356*b* to the recipient. In contrast, for the same input from driver 102, providing a largest width proximal to distal end 306*b* may allow the energy to disperse over a wider area, and a weaker force output is provided relative to providing a narrower distal end when contacting the distal end 306*b* to the recipient. To state another way, adjusting a vertical distance between a distalmost point of end effector 302, 352 and the widest point of aperture 312, 362 allow for the output of end effector assembly 300, 350 to be adjusted. As this vertical distance (labeled H1 in FIGS. 3A-3D) increases, the energy loss through end effector assembly 300, 350 may increase.

In some embodiments, end effectors 302, 352 have a third width W3 (not shown) representing an outer width of the end effector 302, 352. In some embodiments, end effectors 302, 352 have a second height H2 (not shown) representing a distance from the proximal end 306*a*, 356*a* to the distal end 306*b*, 356*b*. The outer width W3 may be generally constant along longitudinal axis 314, 364 at points parallel to aperture 312, 362. Accordingly, the width of contact portion 308, 358 may decrease as the width of aperture 312, 362 increases.

In some embodiments, the ratio of the largest width W1 to the smallest width W2 of aperture 312, 362 is about 1.25 to about 4. In some embodiments, the ratio of the largest width W1 to the smallest width W2 is about 1.5. In some embodiments, the ratio of the maximum outer width W3 of end effector 302, 352 to the largest width W1 of aperture 312, 362 is about 1.25 to about 4. In some embodiments, the ratio of the maximum outer width W3 of end effector 302, 352 to the largest width W1 of aperture 312, 362 is about 1.5.

As discussed above with respect to FIGS. 2A-2F, various structural features may be added to end effectors 302, 352 to adjust the performance of end effector assemblies 300, 350. It is contemplated that any combination of internal support structure 218, internal support bar 220, or inner support 224 may be used with end effectors 302, 352. It will be appreciated that the geometry of internal support structure 218 and/or inner support 224 may change when used with end effectors 302, 352 to match the shape of the end effectors and/or the aperture 312, 362.

Figure 4:
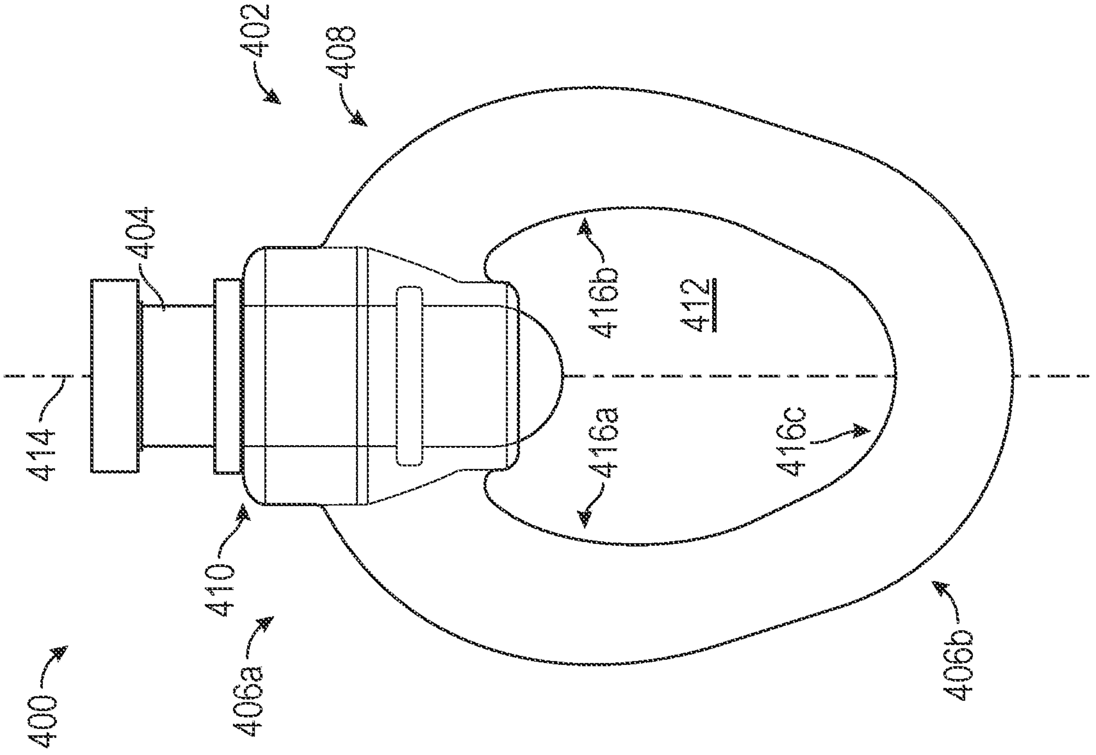
FIG. 4 illustrates a fourth end effector assembly for some embodiments.

FIG. 4 illustrates an end effector assembly 400 for some embodiments of the present disclosure. End effector assembly 400 may comprise end effector 402 and connector 404. Connector 404 may be substantially similar to connector 202 described above. End effector 402 may comprise a proximal end 406*a* and a distal end 406*b*. End effector 402 may further comprise a contact portion 408 and an attachment portion 410. End effector 402 may define an aperture 412 therethrough and may be symmetrical about a longitudinal axis 414.

Aperture 412 may present a general ovular or elliptical shape. An inner surface of contact portion 408 may define a first concave portion 416*a* that opposes a second concave portion 416*b*. Contact portion 408 may also include a third concave portion 416*c*. The third concave portion 416*c* may be connected to concave portions 416*a*, 416*b* via opposing convex portions. First concave portion 416*a* and second concave portion 416*b* may be identical or substantially identical curves that mirror one another. Third concave portion 416*c* may have a curve different than that of concave portions 416*a*, 416*b*. In some embodiments, the third concave portion 416*c* comprises a curve with a smaller diameter and/or arc length than the diameter of concave portions 416*a*, 416*b*.

An arc length of concave portions 416*a*, 416*b* may be longer than an arc length of third concave portion 416*c*. Accordingly, longitudinal axis 414 may form a major axis for the elliptical aperture 412. Providing an elliptical-shaped aperture 412 with a major axis corresponding to longitudinal axis 414 and, therefore, to the reciprocating axis 104 of driver 102, may improve (i.e., reduce) energy loss from driver 102. Thus, it is contemplated that an elliptically shaped aperture 412 having a major axis perpendicular to aperture 412 may be provided when it is desired that more energy is lost from driver 102 such that less force is transferred to the target treatment area. In some embodiments, a ratio of a maximum outer width of end effector 402 to a maximum width of aperture 412 is in the range of about 1 to about 2. In some embodiments, the ratio of the maximum outer width of end effector 402 to a maximum width of aperture 412 is about 1.2. In some embodiments, a ratio of a height of end effector 402 to a maximum width of 412 is in the range of about 1 to about 3. In some embodiments, the ratio is about 1.6.

End effector assembly 400 may include any combination of the above-described internal support structure 218, internal support bar 220, inner support 224, which may be used in conjunction with end effector assembly 400 to adjust the output thereof. As discussed with respect to FIGS. 2A-2F, internal support structure 218, internal support bar 220, and inner support 224, may be used to increase an effective stiffness of end effector 402, thereby reducing the hysteresis, which, in turn, may lead to less energy lost and a greater force transferred from driver 102 to the recipient. It will be appreciated that the geometry of internal support structure 218 and/or inner support 224 may change when used with end effector 402.

Figure 5:
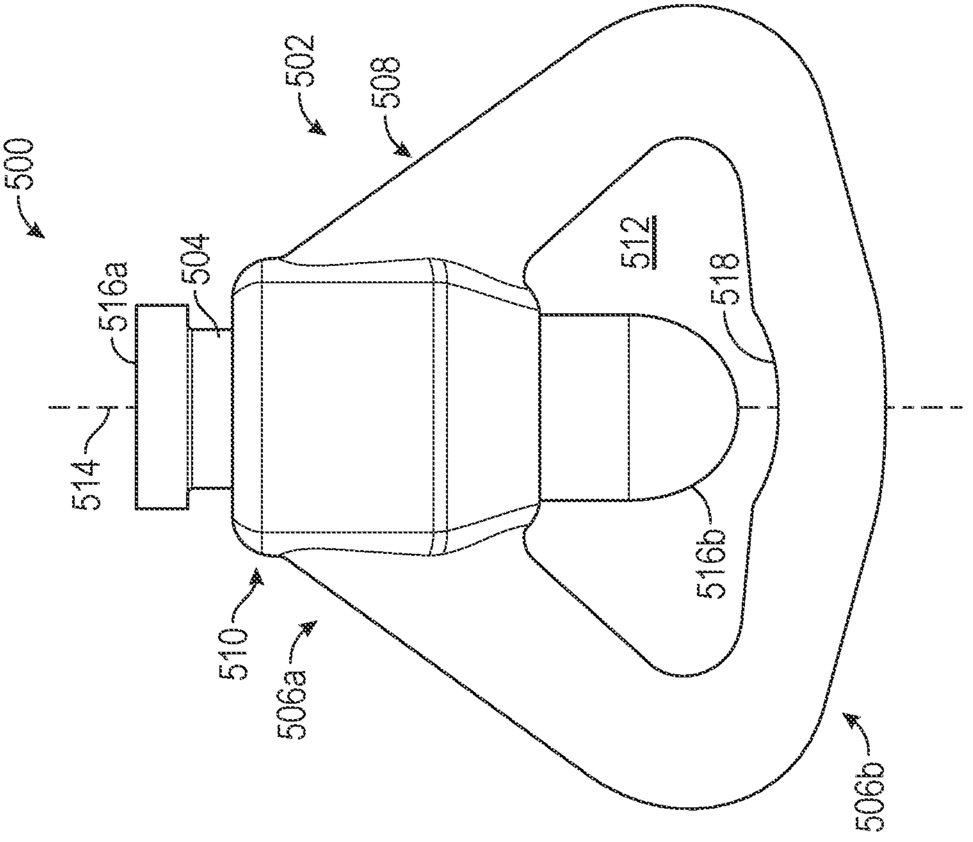
FIG. 5 illustrates a fifth end effector assembly for some embodiments.

FIG. 5 illustrates an end effector assembly 500 for some embodiments of the present disclosure. End effector assembly 500 may comprise an end effector 502 and a connector 504. End effector 502 may comprise a proximal end 506*a* and a distal end 506*b*. End effector 502 may further comprise a contact portion 508 and an attachment portion 510 and define an aperture 512 therethrough. End effector 502 may be symmetrical about a longitudinal axis 514.

Connector 504 may extend through attachment portion 510 and into aperture 512. Connector 504 may have a connector proximal end 516*a* extending proximally out of attachment portion 510, and a connector distal end 516*b* extending distally out of attachment portion 510. In some embodiments, connector 504 extends a distance into aperture 512 such that, when end effector assembly 500 is driven, thereby causing distal end 506*b* to contract in the proximal direction, connector distal end 516*b* may contact an inner surface 518 of distal end 506*b*. Inner surface 518 may be concave to receive the corresponding concave connector distal end 516*b*. In some embodiments, inner surface 518 contacting connector 504 can prevent further proximal movement of distal end 506*b*. Thus, less force may be generated than if connector 504 was not located in aperture 512 to impede the movement of distal end 506*b*. Responsive to contacting connector 504, distal end 506*b* may rebound to a nominal position. Accordingly, end effector 502 may be coupled to connector 504 at a selected location thereon such that connector 504 extends into aperture 512 a desired length. Thus, the force output of end effector assembly 500 may be adjustable by adjusting the length of connector 504 extending into aperture 512. To state another way, the force output may be adjusted by adjusting the distance between a distalmost point on connector 504 and inner surface 518 of distal end **506*b*. To decrease the force output of end effector assembly 500, the distance between connector distal end 516*b* and inner surface 518 may be decreased such that the distance that distal end 506*b* moves proximally on each actuation/oscillation of driver 102 is reduced. Likewise, to increase the force output of end effector assembly 500, the distance between connector distal end 516*b* and inner surface 518 may be increased to increase the travel distance of distal end 506*b*. In some embodiments, connector 504 is slidably coupled to end effector 502, thereby allowing an end user to adjust the position of end effector 502 on connector 504 and, therefore, the force output of end effector assembly 500**.

In some embodiments, end effector 502 comprises a width W1 that is a largest outer width of end effector 502. In some embodiments, W1 is in the range of about 1 inch to about 8 inches. In some embodiments, W1 is about 3 inches. In some embodiments, W1 is about 6 inches. In some embodiments, aperture 512 comprises a maximum width W2 of about 0.8 inches to about 5 inches. In some embodiments, aperture 512 comprises a maximum width W2 of about 3 inches. In some embodiments, a ratio of W2 to W1 is about 0.5 to about 0.8. In some embodiments, end effector 502 comprises a height H1 measured from proximal end **506*a* to distal end 506*b*. In some embodiments, H1 is in the range of 1.5 inches to about 3.5 inches. In some embodiments, H1 is about 2.5 inches. In some embodiments, end effector 502 comprises a depth D1 at distal end 506*b* in the range of 0.5 inches to about 1.5 inches. In some embodiments, the depth at distal end 506*b* is about 0.8 inches. In some embodiments, end effector 502** has a ratio of W1 to D1 of about 2 to about 5. In some embodiments, the ratio of W1 to D1 is about 3.75. In some embodiments, the ratio of W1 to H1 is about 1 to about 2. In some embodiments, the ratio of W1 to H1 is about 1.2. In some embodiments, the ratio of H1 to D1 is about 2 to about 5. In some embodiments, the ratio of H1 to D1 is about 3 or about 3.125.

It will be appreciated that the above-described dimensions are exemplary and that end effector 502 may take various heights, widths, and depths. The dimensions of end effector 502 may be configured based on the parameters (e.g., frequency, amplitude, force, etc.) of the specific driver 102 that end effector 502 is configured to be driven by. As the power provided by driver 102 increases, the size of end effector 502 may increase accordingly.

Figure 6:
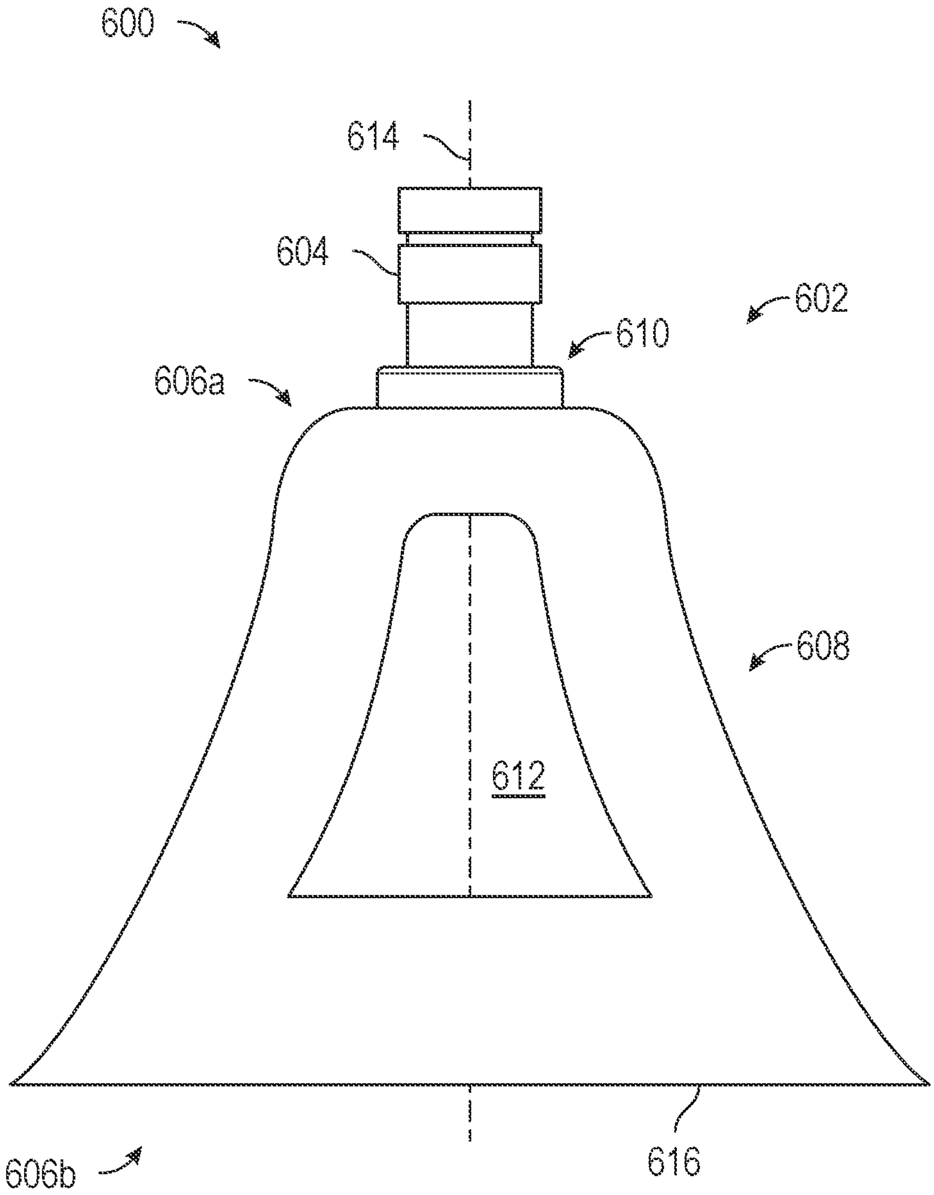
FIG. 6 illustrates a sixth end effector assembly for some embodiments.

FIG. 6 illustrates a planar view of an end effector assembly 600 for some embodiments of the present disclosure. End effector assembly 600 may comprise an end effector 602 and a connector 604. Connector 604 may be substantially similar to connector 204 discussed above. End effector 602 may comprise a proximal end **606*a* and a distal end 606*b*. End effector 602 may further comprise a contact portion 608 and an attachment portion 610. An aperture 612 may extend through end effector 602. End effector 602 may be symmetrical about a longitudinal axis 614**.

As illustrated, end effector 602 presents a bell shape with a shorter width at proximal end **606*a* that transitions to a wider width at distal end 606*b*. In some embodiments, end effector 602 is wider at proximal end 606*a* than at distal end 606*b*. The bell shape may define a substantially flat bottom surface 616. The bottom surface 616 may be configured as a primary contact surface for treatment on the target treatment area. For example, the end effector 602 may be especially useful for treating the stomach area due to the wide contact area. Distal end 606*b*, including substantially flat bottom surface 616, may have a substantially large depth to allow for treatment of sensitive areas, as the energy from driver 102 may be dispersed over a wider area. For example, a ratio of the depth at distal end 606*b* to the height of end effector 602 may be about 0.5 to about 4. Aperture 612 may have a bell-shaped aperture corresponding to the outer shape of contact portion 608. In some embodiments, the shape of aperture 612 does not match the shape of contact portion 608. For example, aperture 612** may instead be circular.

In some embodiments, an end effector is configured with one or more primary contact regions and/or points. The primary contact region(s) may be arcuate regions of the contact portion that are configured to be applied to the target treatment area. In some embodiments, and as shown in FIG. 6, a non-arcuate portion of the contact region of an end effector may be configured as the primary contact region. The primary contact points may have various features thereon for application to the recipient. For example, the primary contact points may have bumps, knurls, or other features for massaging the target treatment area. It will be appreciated, as discussed above, that various regions of contact portion 608 outside of those primary contact points may be used on the target treatment area with energy effectively delivered from driver 102 to the target treatment area because of aperture 612 and the energy efficient material of end effector 602.

Figure 7:
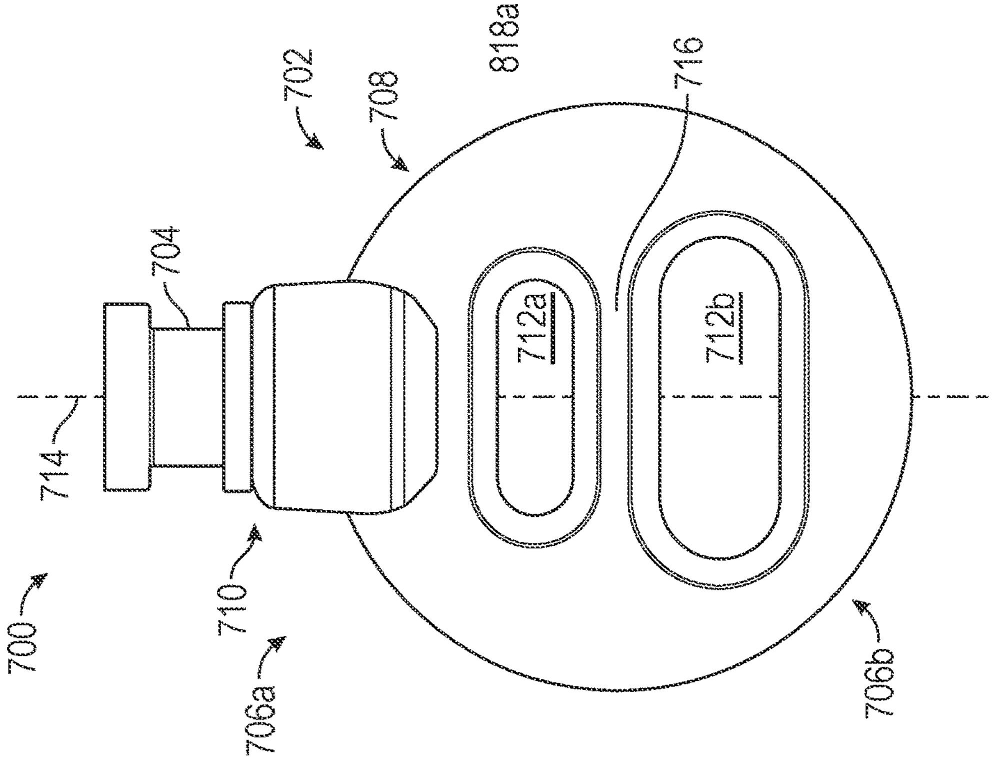
FIG. 7 illustrates a seventh end effector assembly for some embodiments.

FIG. 7 illustrates an end effector assembly 700 for some embodiments of the present disclosure. End effector assembly 700 may comprise an end effector 702 and a connector 704. Connector 704 may be substantially similar to connector 204 described above. In some embodiments, end effector 702 comprises a proximal end **706*a* and a distal end 706*b*. In some embodiments, end effector 702 further comprises a contact portion 708 and an attachment portion 710. End effector 702 may define a first aperture 712*a* and a second aperture 712*b* therethrough and may be generally symmetrical about a longitudinal axis 714. First aperture 712*a* is located proximal to proximal end 706*a*, and second aperture 712*b* is located proximal to distal end 706*b*. A membrane 716 separates first aperture 712*a* and second aperture 712*b***.

As shown, apertures **712*a*, 712*b* may be generally ovular or stadium shaped. Other geometries (e.g., rectangular) are within the scope hereof. In some embodiments, second aperture 712*b* is larger than first aperture 712*a*. In some embodiments, second aperture 712*b* comprises a width of about 2 inches to about 4 inches. In some embodiments, a ratio of a width of second aperture 712*b* to a width of first aperture 712*a* is about 1.25 to about 2. In some embodiments, a ratio of a height of second aperture 712*b* to a height of first aperture 712*a* is about 1.5 to about 2.5. In some embodiments, second aperture 712*b* comprises an area that is about 1.5 to about 3 times greater than an area of first aperture 712*a*. In some embodiments, first aperture 712*a* is larger than second aperture 712*b*. In some embodiments, first aperture 712*a* and second aperture 712*b* are approximately equivalent in size. The largest aperture 712*a*, 712*b* may contract more than the smaller aperture. When the larger aperture is placed proximal to distal end 706*b*, the energy transfer may be greater as compared to placing the larger aperture proximal to proximal end 706*a***.

As compared to end effector 202 described above, with all else equal except for apertures 212, **712*a*, 712*b*, end effector 702 may have a lower energy transfer due to the increased amount of material forming end effector 702 and the corresponding smaller contraction and rebound. Thus, when provided the same input from driver 102, end effector 702 may contract less than end effector 202, and the delivered force to the recipient may be less as compared to end effector 202**.

End effector assembly 700 may include any combination of the above-described internal support structure 218, internal support bar 220, inner support 224, which may be used in conjunction with end effector assembly 700 to adjust the output thereof. As discussed with respect to FIGS. 2A-2F, internal support structure 218, internal support bar 220, and inner support 224, may be used to increase an effective stiffness of end effector 702, thereby reducing the hysteresis, which, in turn, may lead to less energy lost and a greater force transferred from driver 102 to the recipient. It will be appreciated that the geometry of internal support structure 218 and/or inner support 224 may change when used with end effector 702.

Figure 8A:
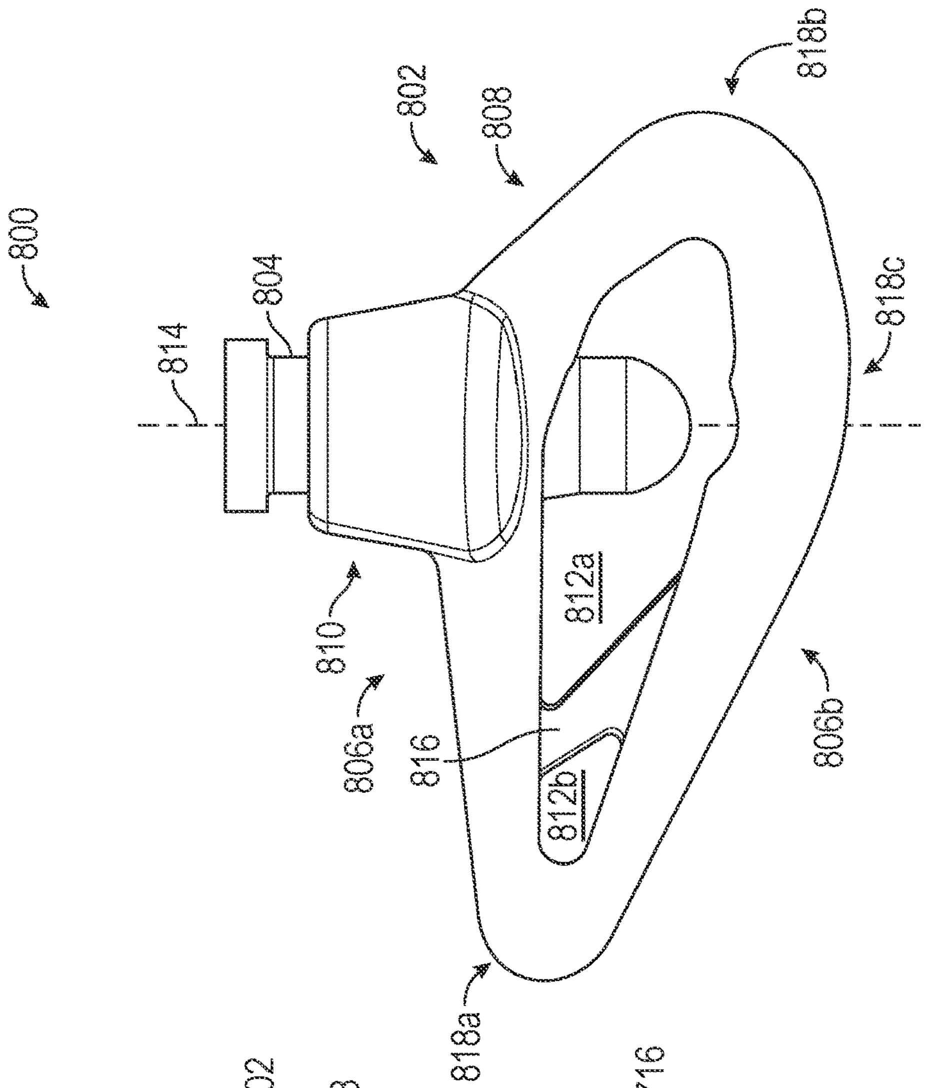
FIG. 8A illustrates an eighth end effector assembly for some embodiments.

FIG. 8A illustrates an end effector assembly 800 for some embodiments of the present disclosure. End effector assembly 800 may comprise an end effector 802 and a connector 804. Connector 804 may be substantially similar to end effector 202 described above. End effector 802 may comprise a proximal end 806*a* and a distal end 806*b*. End effector 802 may further comprise a contact portion 808 and an attachment portion 810. End effector 802 defines a first aperture 812*a* and a second aperture 812*b* separated by a membrane 816. Membrane 816 may extend from proximal end 806*a* to distal end 806*b*, separating first aperture 812*a* from second aperture 812*b*, and may provide mechanical support for contact portion 808. In contrast to the aforementioned end effectors, end effector 802 is asymmetric about the longitudinal axis 814.

In some embodiments, end effector 802 comprises a first corner 818*a*, a second corner 818*b*, and a third corner 818*c*. Each corner 818*a*, 818*b*, 818*c* may be configured as a primary contact region to apply to the target treatment area. As such, each corner 818*a*, 818*b*, 818*c* may be formed with a distinct geometry (e.g., depth, radius, etc.) such that contacting the corner to the recipient produces a distinct output as compared to a different corner. Additionally, the location of a corner 818*a*, 818*b*, 818*c* from longitudinal axis 814 may affect the output thereof. Corners located further longitudinal axis 814 may experience more energy losses. For example, first corner 818*a* may be sharper relative to corners 818*b*, 818*c* to provide a higher impact force. A sharper corner may have a smaller depth and/or a smaller radius as compared to blunter corners. Due to the relative sharpness of first corner 818*a*, first corner 818*a* may be used on areas of the recipient that are more difficult for blunter corners to efficiently impact.

Second corner 818*b* may be relatively blunt as compared to first corner 818*a*. Second corner 818*b* may be offset from longitudinal axis 814. Accordingly, end effector assembly 800 may be oriented at an appropriate angle to impact the recipient. Second corner 818*b* may have a larger radius and/or a larger depth than first corner 818*a*, thereby providing a lesser force output than that of first corner 818*a*.

Third corner 818*c* may be located generally along longitudinal axis 814. Due to being in-line with the reciprocating axis 104, third corner 818*c* may provide the largest force output out of corners 818*a*, 818*b*, 818*c*. As discussed above with respect to end effector assembly 500, connector 804 may impact contact portion 808 at third corner 818*c* when driven, and the length that connector 804 extends within first aperture 812*a* may be adjusted to adjust the force output from driver 102. As with inner surface 518 discussed above, an inner surface of contact portion 808 may be concave to interface with a distal end of connector 804. While end effector 802 may be configured with primary contact points on contact portion 808 (i.e., corners 818*a*, 818*b*, 818*c*), it will be appreciated that generally any surface on contact portion 808 may be contacted to the target treatment area for treatment thereof as previously discussed.

Figure 8B:
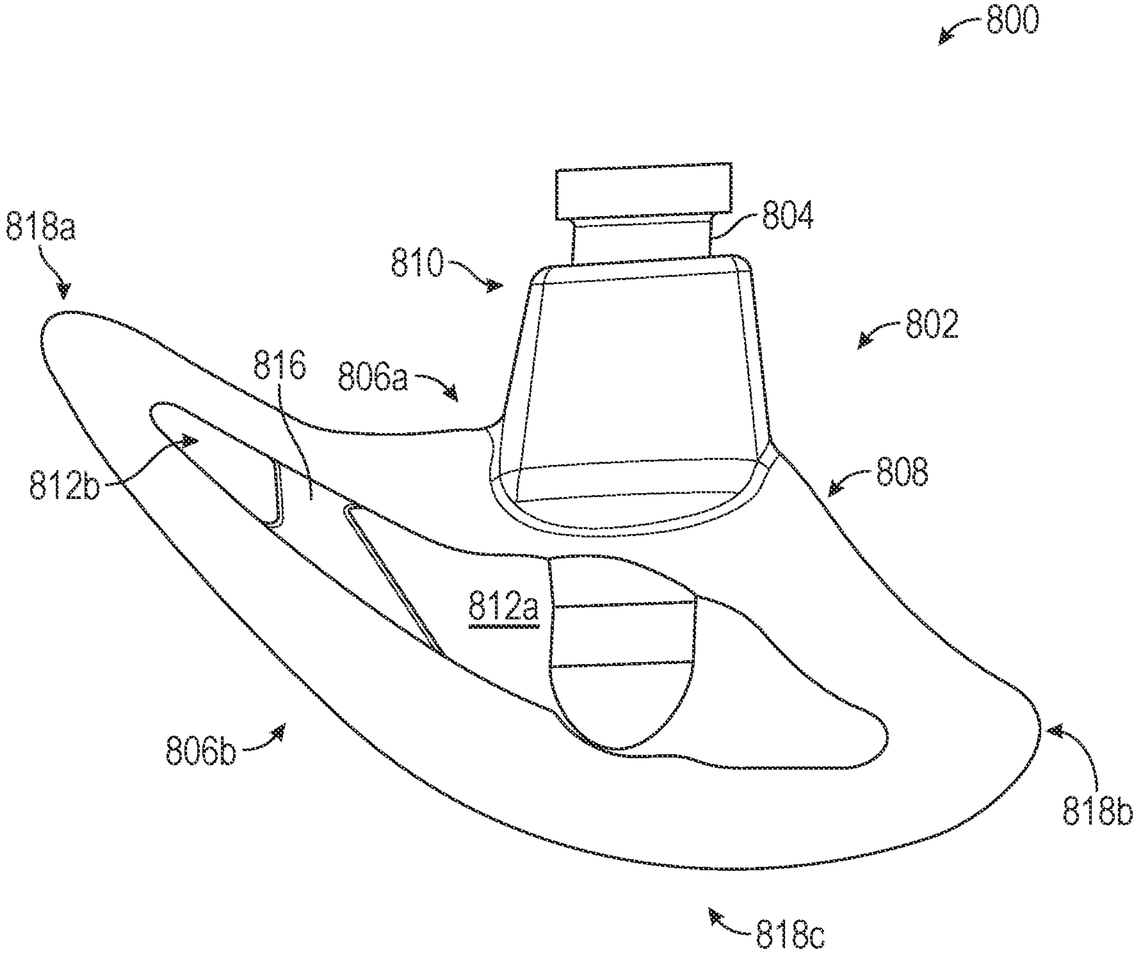
FIG. 8B illustrates the eighth end effector assembly in a compressed state for some embodiments.

FIG. 8B illustrates end effector 802 in a compressed or contracted state for some embodiments of the present disclosure. The contracted state of end effector 802 (and the other end effectors described herein) may be the state of end effector 802 when driver 102 is at a fully extended/maximum amplitude position. The nominal state of the end effector may be when driver 102 is at a home position. As shown, first aperture 812*a* has flexed proximally due to the energy imparted to end effector 802, while third corner 818*c* has compressed or contracted proximally. In some embodiments, third corner 818*c* contracts such that the inner surface at membrane 816 contracts a distal surface of connector 804 as previously discussed.

Figure 9B:
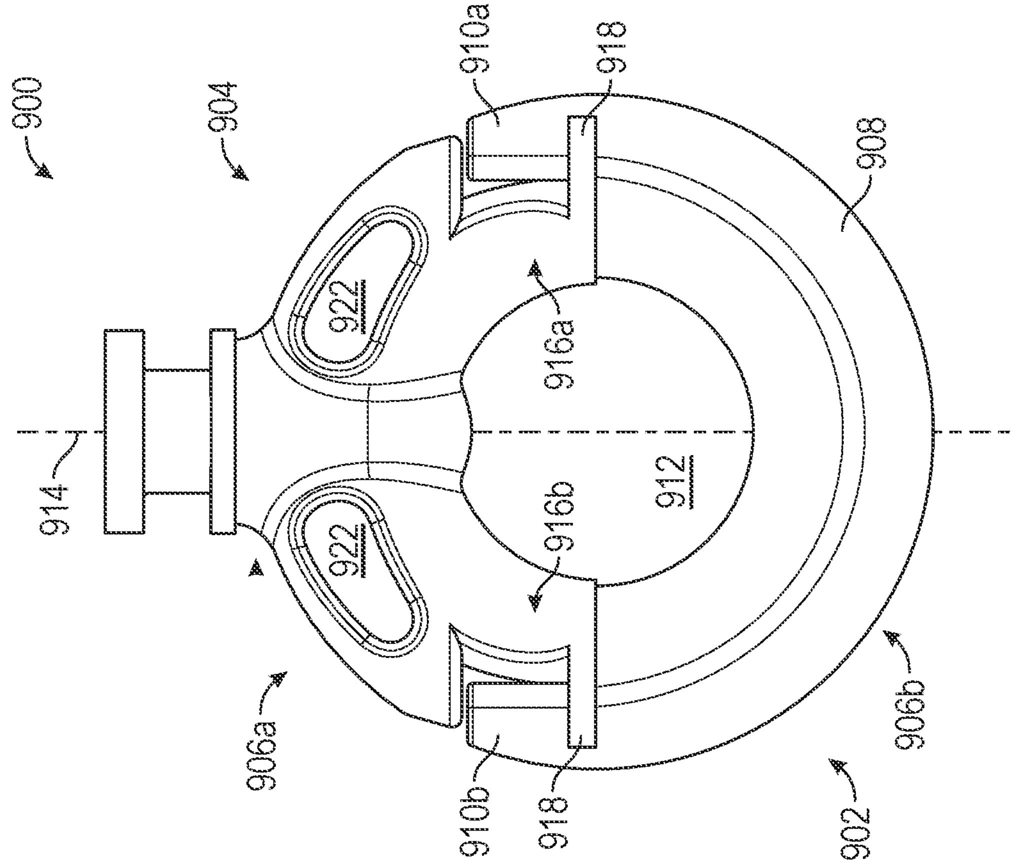
FIG. 9B illustrates a planar view of the ninth end effector assembly for some embodiments.
Figure 9A:
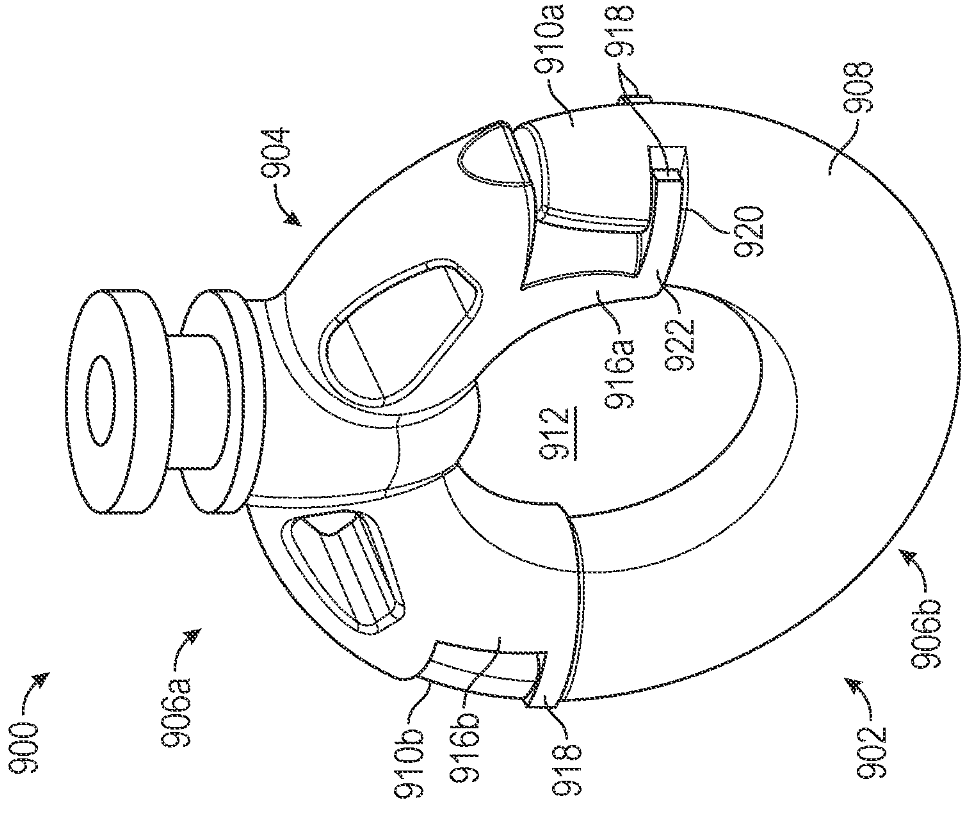
FIG. 9A illustrates a perspective view of a ninth end effector assembly for some embodiments.

FIGS. 9A and 9B illustrate a perspective view and a planar view, respectively, of an end effector assembly 900 for some embodiments of the present disclosure. End effector assembly 900 may comprise an end effector 902, a connector 904, a proximal end 806*a*, and a distal end 906*b*. End effector 902 may couple to connector 904 via a snap fitting. It will be appreciated that end effector 902 and connector 904 could instead be formed as an integral unit such that end effector 902 is not detachable from connector 904.

End effector 902 may further comprise a contact portion 908, a first attachment portion 910*a* and a second attachment portion 910*b*. A contact portion 908 of end effector 902 may be configured to be contacted to the recipient. End effector 902 may comprise a first attachment portion 910*a* and a second attachment portion 910*b*. As shown, both end effector 902 and connector 904 are generally semicircular and coupled to one another at respective endpoints of the semicircular shape. Thus, when coupled, end effector 902 and connector 904 may define a circular aperture 912 therethrough. End effector assembly 900 may be symmetric about longitudinal axis 914. In some embodiments, connector 904 is rotatable about driver 102.

While end effector 902 and connector 904 are illustrated as semicircles, it will be appreciated that either or both of end effector 902 and connector 904 may take various shapes. In some embodiments, the shape of end effector 902 corresponds to that of connector 904, while, in other embodiments, the shapes are distinct. For example, end effector 902 and connector 904 may be partial ovals, which, when connected, form an ovular aperture 412. As another example, connector 904 may be as shown in FIGS. 9A and 9B, and end effector 902 may take any other shape such as any of the shapes described above with respect to end effectors 202, 302, 352, 402, 502, 702, 802. Still further, a snap fit connector 904 may be used to form more than one aperture 912. For example, connector 904 may be formed with a membrane extending laterally from first attachment portion 910*a* to second attachment portion 910*b*. Alternatively, or in addition, end effector 902 may be formed with a membrane that extends through 912 when end effector 902 couples to connector 904.

In some embodiments, connector 904 comprises a first receiving portion 916*a* and a second receiving portion 916*b*. First receiving portion 916*a* may couple to first attachment portion 910*a*, and second receiving portion 916*b* may couple to second attachment portion 910*b* or vice versa. Receiving portions 916*a*, 916*b* may take any form of quick connect fitting. In some embodiments, receiving portions 916*a*, 916*b* comprise arms 918 that define an opening therebetween. The arms 918 may frictionally fit with attachment portions 910*a*, 910*b*, and attachment portions 910*a*, 910*b* may be at least partially received within the openings. Attachment portions 910*a*, 910*b* may comprise a top surface 920 that abuts or is proximal to a bottom surface 920 of receiving portions 916*a*, 916*b* when coupled. In some embodiments, connector 904 comprises apertures 922 near proximal end 906*a*. The apertures 922 may allow for flexure of connector 904 when driven by driver 102. Connector 904 may comprise any of the materials discussed above with respect to connector 204.

The snap fit coupling between end effector 902 and connector 904 allows for interchangeability of various end effectors to a singular connector 904. For example, a first end effector formed of a relatively soft material may be coupled to connector 904 to treat a sensitive area on the recipient. Thereafter, a second end effector formed of a harder material may be coupled to connector 904 to treat a less sensitive area or an area that requires a higher impact to effectively treat. The operator may easily change between the first end effector and the second end effector because of the snap fit connection.

Figure 10:
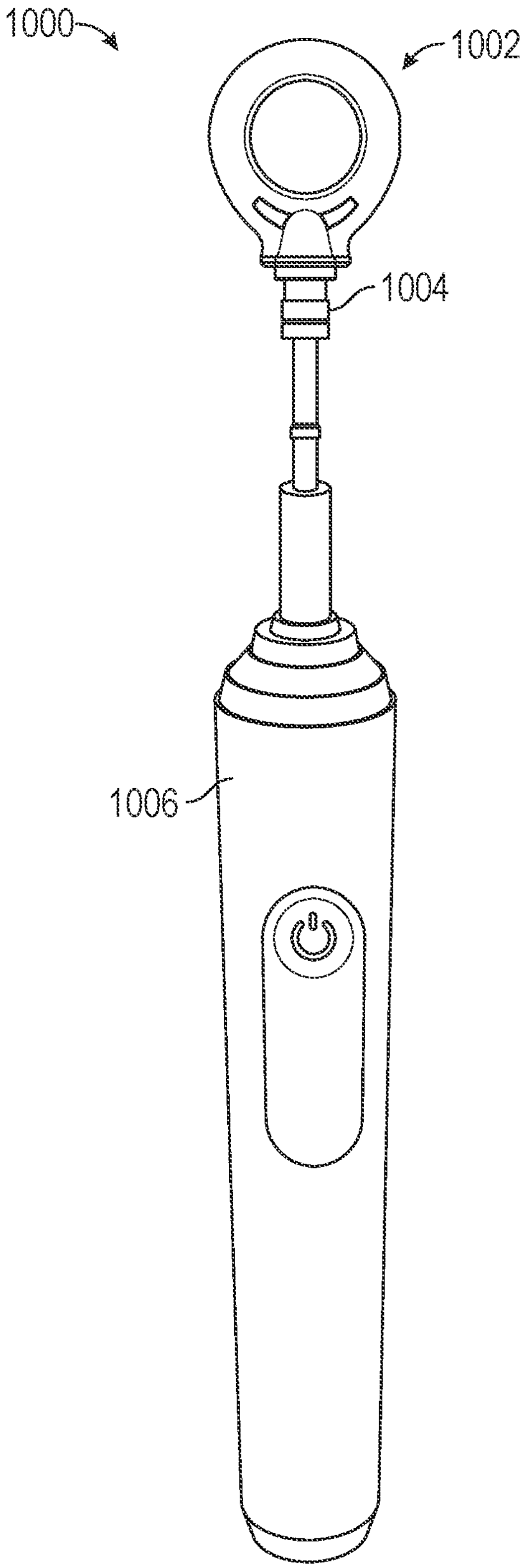
FIG. 10 illustrates a tenth end effector assembly for some embodiments.

FIG. 10 illustrates an end effector assembly 1000 for some embodiments of the present disclosure. End effector assembly 1000 comprises an end effector 1002 coupled to a connector 1004, which in turn is coupled to a driver 1006. Here, the driver 1006 is an ultrasonic driver, such as an electric toothbrush. For example, the driver 1006 may be a vibrational motor configured to produce sonic or ultrasonic output. Driver 1006 may drive end effector 1002 in an oscillatory/reciprocating manner as discussed above with respect to driver 102.

End effector assembly 1000 may be used to treat more sensitive areas of the body than the above-described assemblies. For example, it is contemplated that end effector assembly 1000 may be used to treat a person's face. For example, using end effector assembly 1000 on the jaw area of a person may be used to treat temporomandibular disorders (TMDs), such as discomfort in the temporomandibular joint (TMJ). The impact from the end effector 1002 may stretch and/or massage the soft tissues and muscles surrounding the TMJ, which may relieve discomfort at the joint.

It will be appreciated that releasing TMJ to relieve discomfort using an end effector is not limited to the above-described end effector assembly 1000. Generally, it is contemplated that any end effector discussed herein may be used on any part of the body to treat various ailments. For example, the various embodiments of the end effectors 202 shown in FIGS. 2A-2F may also be used for releasing the TMJ. In some embodiments, the end effector assembly 200 may comprise an aperture 212 in the range of about 3 inches to about 4 inches may be used to for myofascial release. Other dimension may also be used. For example, it is contemplated that end effector assembly 200 may be used to treat a person's face. For example, using end effector assembly 200 on the jaw area of a person may also be used to treat TMDs, such as discomfort in the TMJ. In some embodiments, the end effector assembly 200 may be used on the forehead area to treat various discomforts. For example, the end effector assembly 200 may be used to alleviate headaches by targeting and releasing the temporalis muscle.

There are various advantages gained by using the end effector assembly 200 to treat a person's face. For example, the end effector assembly 200 may be used on a person's face without risking any injury to a person's jaw or brain. The oscillating output of the end effector assembly 200 may allow waveforms created from the impact of the end effector assembly 200 with a person's face to further penetrate a person's body for myofascial release with minimal injury risk due at least in part to the compressive nature of the input and the material of the end effector 202.

It is contemplated that the end effectors described herein may be formed from a plurality of materials without departing from the scope hereof. As previously discussed, an elastomer or a rubber may be used. In some embodiments, the elastomer is a thermoplastic or a thermoset. In some embodiments, the end effector is formed from a thermoplastic, a thermoplastic polyurethane (optionally with a glass fiber additive), a thermoplastic elastomer, carbon fiber or glass fiber additive thermoplastic additive thermoplastic material, PEBAX, nylon, polycarbonate, polypropylene, polyester, aluminum, 100% carbon fiber, carbon fiber blend, or the like, or any combination thereof. In some embodiments, the polyurethane is cast and may be over-molded onto the connector, internal support structure 218, internal support bar 220, or any combination thereof. In some embodiments, the end effector is a rubber that is over-molded onto a connector formed for a harder material than the rubber. In some embodiments, the end effector is a polyurethane casted over a connector formed of a thermoset polyurethane, thereby integrally bonding the end effector to connector 204. For example, an end effector assembly may comprise a thermoset polyurethane end effector integrally bonded to thermoplastic polyurethane or glass TPU connector. The cast PU end effector may have a hardness of about 65 Shore A or about 70 Shore A and a Bayshore rebound of about 90%, and the connector may have a hardness of around 65 Shore D. By integrally bonding the end effector to the connector, it is contemplated that the transfer of energy from the driver to the end effector assembly may be more efficient as less energy may be lost through vibration energy dissipation. Furthermore, the energy efficiency may be further increased by bonding similar materials (e.g., two polyurethane polymers) of different hardness together such as by forming the end effector from a TPU that is softer than a TPU of the connector.

Figure 11:
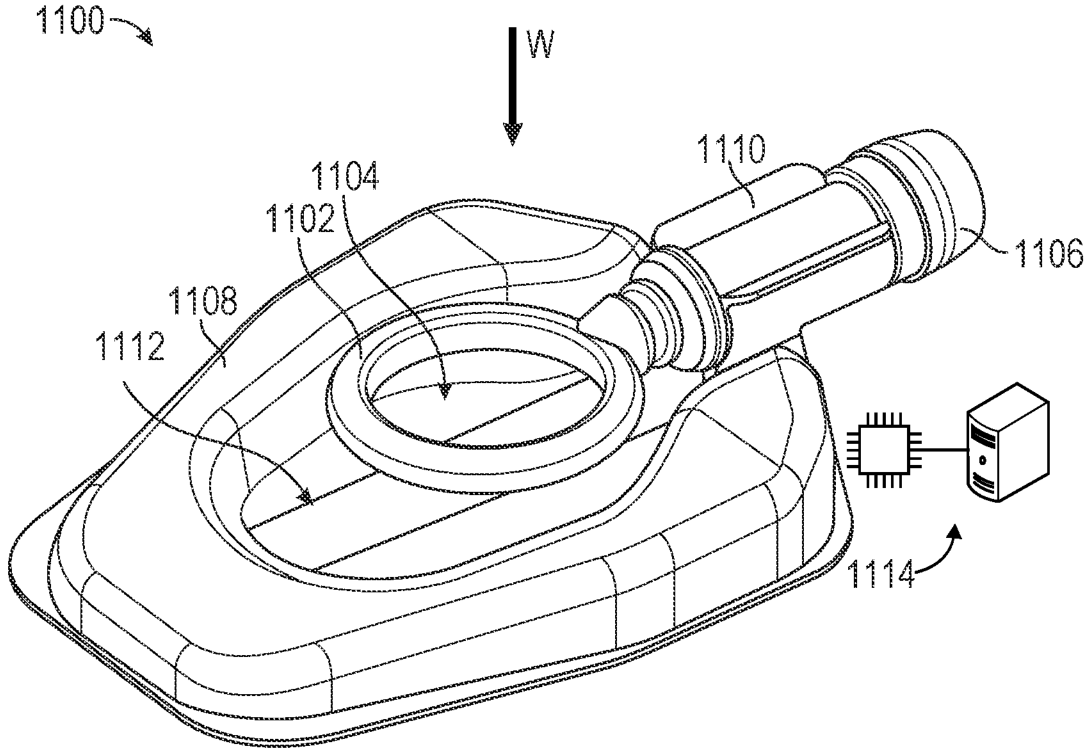
FIG. 11 illustrates an eleventh end effector assembly for some embodiments.

FIG. 11 illustrates an end effector assembly 1100 for some embodiments of the present disclosure. End effector assembly 1100 comprises an end effector 1102 having an aperture 1104, a driver 1106, a pad 1108, a mount 1110, or any combination thereof. End effector 1102 may be substantially similar to end effector 202 discussed above or any other end effectors discussed herein. In some embodiments, end effector 1102 comprises a ratio of the outer diameter of an aperture 1104 to an outer diameter of end effector 1102 of about 0.7. In some embodiments, end effector 1102 comprises an outer diameter of about 6 inches and an inner diameter of about 4.4 inches.

End effector assembly 1100 may further comprise a pad 1108. Pad 1108 may be a cushion or other soft surface for placing against the recipient. Pad 1108 may have an opening 1112, and end effector 1102 may reside within, above, or below a plane defined by opening 1112. Thus, the recipient may contact pad 1108 while end effector 1102 operates on the target treatment area. For example, the recipient may sit on pad 1108 such that end effector 1102 contacts the pelvic region. The pad 1108 may provide a comfortable area for the recipient to place their weight while end effector assembly 1100 operates. In some embodiments, no opening 1112 is present, and end effector 1102 may be disposed above pad 1108.

End effector assembly 1100 may also comprise a mount 1110. Mount 1110 may be configured to hold end effector 1102 and driver 1106 substantially stationary during operation. As shown, driver 1106 is received within a first portion of mount 1110, and a second portion of mount 1110 abuts and supports a bottom surface of pad 1108. Mount 1110 may be formed of a relatively stiff material to support end effector 1102, driver 1106, and pad 1108 as will be appreciated by one of skill in the art.

Because the user's weight W may act on end effector 1102, end effector assembly 1100 provides for the rebound of end effector 1102 to be mitigated in the direction opposite where the applied force acts. Accordingly, by mitigating the rebound in a first direction (e.g., opposite W), a greater rebound may be delivered opposite the first direction (e.g., along W), thereby providing a greater force output as compared to no external force being applied.

As one example, end effector assembly 1000 may be used such that the recipient such that end effector 1102 contacts the scapula of the patient. For example, the recipient may be sitting in a chair place end effector assembly 1000 between their back and the back of the chair. Accordingly, the force of the user pressing their back into the end effector 1102 becomes the external force that reduces the rebound force of end effector 1102 in a certain direction, causing the rebound force in an opposite direction to be increased. As another example, the recipient may sit or lay on pad 1108 such that end effector 1102 contacts the pelvic region. As previously discussed, each reciprocation of end effector 1102 may cause the firing of the GTOs and/or muscle spindle fibers and, in some embodiments, the end effector assemblies described herein may be configured to be rapidly driven (e.g., at about 2000 rpm), such that the GTOs and/or muscle spindle fibers are fired at the same rate. In some embodiments, end effector 1102 twists about a longitudinal axis (not shown) due to the shape of the target treatment areas. This twisting motion may further affect the output of the end effector assembly 1000 and may also cause the firing of the GTOs and/or muscle spindle fibers. For example, as each side of end effector 1102 twists, the side that twists such that said side moves towards the target treatment area may deliver a higher force to the target treatment area. As each side repeatedly twists towards and away from the target treatment area, this higher force may be delivered repeatedly by each side. As the ratio of the outer diameter of the aperture 1104 to the outer diameter of end effector 1102 increases (thereby decreasing the thickness of end effector 1102), the twisting effect may increase and, accordingly, the force delivered to the target treatment area by end effector assembly 1100.

It is contemplated that, instead of a user sitting on pad 1108 to apply an external force, an operator may use their hand (or apply any other external force) to press on a first side of the end effector 1102 while a second side is held in contact with a target treatment area on the recipient to modify the force output. For example, turning back to FIG. 2B, an operator may contact front face 216*a* with the recipient and apply a force to back face 216*b* (e.g., by using their hand) to reduce the rebound outward from back face 216*b* to thereby increase the rebound force outward from front face 216*a*. Thus, a higher force may be delivered than if the end effector 1102 operated freely, i.e., without an external force being applied. In some embodiments, when used with the application of an external force, the end effector is configured to be held approximately parallel to the target treatment area. That is, one of front face 216*a* may be configured to contact the target treatment area, and front face 216*a* may be oriented to form an angle of about 0 degrees to about 20 degrees relative to the target treatment area. The operator may slide the end effector over the target treatment area for providing therapeutics thereto.

As discussed previously, a driver 1106 may drive the oscillating motion of end effector 1102, which may cause the contraction and rebound of end effector 1102 about aperture 1104. Driver 1106 may be any type of driver discussed above. For example, driver 1106 may be a solenoid-based driver, a variable frequency drive, or any other drive type. In some embodiments, the driver 1106 is controlled by a control system 1114 such that the driver 1106 be operated in a programmable manner. For example, control system 1114 may be used to change the operational parameters of driver 1106 such as the RPMs, frequency, etc.

In some embodiments, end effector assembly 1100 (and the other assemblies discussed herein) may be controlled by executing computer-executable instructions. The computer-executable instructions may be stored on control system 1114 associated with and communicatively coupled to end effector assembly 1100 in some embodiments. Control system 1114 may comprise one or more non-transitory computer-readable media storing computer-executable instructions that, when executed by at least one processor (such as within control system 1114), control the operations of driver 1106. Control system 1114 may comprise a computer, which may be at least one of a desktop computer, a laptop, a mobile phone, a tablet, or a virtual machine, and control system 1114 may comprise at least one controller, a transmitter, a receiver, a server, a processor, a memory, any combination thereof, and any components necessary for electrically communicating information between components and connecting to a local network and the Internet via a wired or wireless communication medium.

Operation of End Effector Assemblies

Exemplary operation and uses of the various end effector assemblies are discussed hereinafter. Operation will be discussed with respect to end effector assembly 200, but it will be appreciated that the operations discussed with respect to end effector assembly 200 are applicable to the other end effector assemblies discussed herein. As previously discussed, the end effectors may be used to fire the GTOs and cause rapid contraction and release of the muscle spindle fibers, which may aid in curing/treating various ailments in the recipient.

As described above, the end user may hold driver 102 in various orientations to contact various regions of contact portion 208 to the target treatment area of the recipient. Contacting various regions at various orientations may produce different outputs. Furthermore, it will be appreciated that adjusting the inputs from driver 102 may alter the output of the end effector assembly.

When the driver 102 is powered, end effector 202 reciprocates, and the energy from driver 102 is transferred to end effector 202, causing contraction. The contraction may be along reciprocating axis 104. Energy is stored in the end effector 202 and released as end effector 202 rebounds. The rebound or restoring force may then be transferred to the target treatment area. In some embodiments, the energy is delivered as a mechanical wave. The wave may be a compressive wave. In some embodiments, the end effector assembly 200 is held in contact with the target treatment area as driver 102 reciprocates. Holding end effector 202 in contact with the target treatment area may cause proximal end 206*a* to contract towards distal end 206*b*, while distal end 206*b* may have substantially small displacement. In some embodiments, end effector assembly 200 is operated percussively.

The end effectors may be used to treat various medical ailments as will be appreciated by those of skill in the art. The end effectors may be used for typical massage purposes to increase circulation and treat microtraumas at the target treatment areas. As discussed with respect to FIG. 10, an ultrasonically driven end effector may be configured for treating TMJ. As another example, it is contemplated that the end effectors may be applied to the abdominal region of a patient to treat and relieve constipation as the force from the end effectors may work to break up the stool in the colon. The material and presence of at least one aperture allows for a sufficient impact to be provided without injuring the recipient at the contact area.

Figure 12:
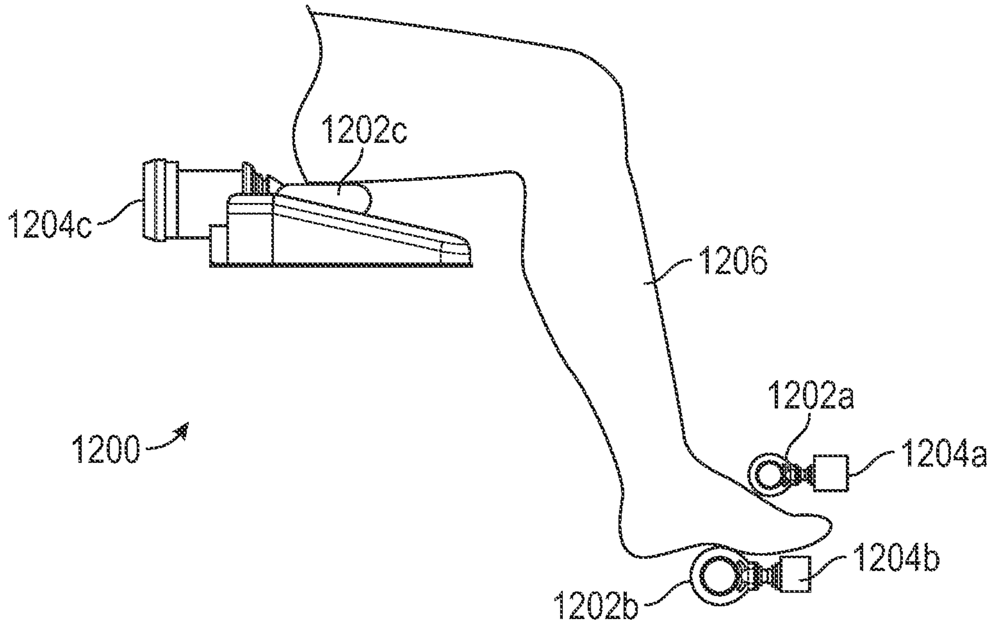
FIG. 12 illustrates an exemplary system in accordance with embodiments of the present disclosure.

FIG. 12 depicts an exemplary system 1200 that illustrates how multiple end effectors may be used together to treat a recipient. System 1200 comprises a first end effector 1202*a* driven by a first driver 1204*b*, a second end effector 1202*b* driven by a second driver 1204*b*, and a third end effector 1202*c* driven by a third driver 1204*c*. As shown, the end effector 1202*a*, 1202*b*, 1202*c* are each operating on a target treatment area of a recipient 1206, shown here as a person's leg. End effector 1202*c* and third driver 1204*c* may correspond to end effector 1102 and driver 1006 discussed above. It will be appreciated that the illustrated orientations of end effector 1202*a*, 1202*b*, 1202*c* are for example purposes only, and that the orientation of each end effector may be varied during operation. For example, end effector 1202*a* may be operated with the operator's hand pressing on a first face opposite a face in contact with the top of the foot of recipient 1206 as discussed above. Each driver 1204*a*, 1204*b*, 1204*c* may operate independently from the other drivers. For example, driver 1204*a* may operate at a first, highest speed, first driver 1204*b* may operate at a second, middle speed, and third driver 1204*c* may operate at a third, lowest speed. Likewise, each driver may operate at varying forces, amplitudes, frequencies, etc.

Each end effector 1202*a*, 1202*b*, 1202*c* may comprise different materials, different internal support structures, different sizes, different aperture to outer width ratios, and the like. Accordingly, each end effector may produce a different output, which may be tailored to the target region on recipient 1206. In some embodiments, when multiple end effectors are used and applied to a recipient 1206, the output waves produced by each end effector and delivered to the recipient 1206 may interact to produce an output distinct from either end effector. Thus, a unique output may be obtained that may not be realized by operating the end effectors 1202*a*, 1202*b*, 1202*c* separately. For example, the three outputs from end effectors 1202*a*, 1202*b*, 1202*c* may interact and cause a discordant wave that may cause the firing of the GTOs and muscle spindle fibers. As another example, two end effectors 1202*a*, 1202*b* may be used and aimed at a specific region in the recipient 1206, such as the foot area. The angle that each end effector 1202*a*, 1202*b* is placed against the recipient may provide for the combined output to be adjusted. For example, placing a first end effector 1202*a* on the top of the foot and a second 1202*b* on the bottom of the foot and concurrently operating may allow for the two end effectors 1202*a*, 1202*b* to work in tandem to therapeutically treat the foot due to the interaction of the energy delivered by each end effector within the recipient 1206.

While FIG. 12 is illustrated with respect to treating a person's leg, it will be appreciated that the multi-end effector embodiment discussed may be used on various regions of the body. For example, the shoulder region may be treated with two end effectors, wherein a first end effector contacts the trapezius near where the neck and shoulder join, and a second end effector contacts the trapezius from the back. As another example, a vertebral level of the spine can be targeted, with a first end effector contacting proximal to a superior vertebra, and a second end effector contacting proximal to an inferior vertebra.

When two end effectors are used simultaneously, the end effectors may be held in opposing orientations, such that the two output waves may interact. By an opposing orientation, it is meant that the end effectors may impact the target treatment area on opposite sides thereof. For example, where the target treatment area is the disc region between two vertebrae, contacting the first end effector to the superior vertebra and the second end effector to the inferior vertebra places the two end effectors in opposing orientations. Thus, the output of the two end effectors may converge to produce an undulation. The undulation may be due to the constructive interference of the two mechanical waves produced by the two end effectors. The use of multiple end effectors on a target treatment area may cause a confluent output. Furthermore, because of the increased output provided by using two end effectors simultaneously on the same target treatment area, less input power to each end effector may be required. Accordingly, the battery life of the driver may be prolonged. Additionally, less heat may be generated.

Clause 1. An end effector assembly for therapeutics, comprising: an end effector having a proximal end and a distal end, comprising: an attachment portion at the proximal end, the attachment portion configured to couple the end effector assembly to a reciprocating therapeutic device; and a toroidal contact portion extending from the attachment portion, the toroidal contact portion defining at least one aperture, wherein a ratio of a width of the at least one aperture to an outer width of the toroidal contact portion is at least 0.33, and wherein when driven by the reciprocating therapeutic device, the end effector contracts and rebounds about the at least one aperture to transfer energy to a target treatment area in contact with the end effector; and an internal support structure received at least partially within the end effector at the proximal end.

Clause 2. The end effector assembly of clause 1, further comprising a connector coupled to the attachment portion at a first end and to the reciprocating therapeutic device at a second end.

Clause 3. The end effector assembly of clause 1, wherein the end effector is formed from a first material, wherein the internal support structure is formed from a second material having a greater hardness than the first material, wherein the first material is an elastomer, and wherein the second material comprises one of: a carbon fiber or a thermoplastic.

Clause 4. The end effector assembly of clause 1, wherein the toroidal contact portion comprises a first cross-sectional area and the internal support structure comprises a second cross-sectional area, and wherein the second cross-sectional area is in a range of 10% to 50% of the first cross-sectional area.

Clause 5. The end effector assembly of clause 1, wherein the internal support structure comprises a first perimeter that is at least 20% of a second perimeter of the toroidal contact portion.

Clause 6. The end effector assembly of clause 1, wherein the end effector comprises a material having a coefficient of restitution in a range of 0.8 to 0.85, and wherein the material comprises a hardness in a range of 50 Shore A to 75 Shore D.

Clause 7. The end effector assembly of clause 1, wherein the at least one aperture comprises a first aperture and a second aperture, wherein the first aperture is proximal to the distal end and the second aperture is proximal to the proximal end, and wherein a ratio of a first area of the first aperture to a second area of the second aperture is in a range of 1.5 to 3.

Clause 8. An end effector assembly for therapeutics, comprising: an end effector having a proximal end and a distal end, the end effector comprising: an attachment portion at the distal end, the attachment portion having a bore extending at least partially along a longitudinal axis of the end effector; a contact portion extending from the attachment portion; an aperture extending through the contact portion, wherein the aperture comprises a first width at the proximal end and a second width distinct from the first width at the distal end, and wherein when driven by a reciprocating driver, the end effector contracts and rebounds about the aperture to transfer energy to a target treatment area in contact with the end effector; and a connector having a connector distal end received within the bore and a connector proximal end configured to couple to the reciprocating driver.

Clause 9. The end effector assembly of clause 8, wherein the first width is greater than the second width.

Clause 10. The end effector assembly of clause 8, wherein the second width is greater than the first width.

Clause 11. The end effector assembly of clause 8, wherein the end effector is formed from a first material, and wherein the connector is formed from a second material having a greater hardness than the first material, wherein the first material comprises a thermoset polyurethane and the second material comprises a thermoplastic polyurethane.

Clause 12. The end effector assembly of clause 8, wherein the end effector comprises an elastomer having a Bayshore resilience of at least 40% and a hardness in a range of 50 Shore A to 75 Shore D.

Clause 13. The end effector assembly of clause 8, wherein the end effector and the connector are integral.

Clause 14. An end effector assembly for therapeutics, comprising: an end effector having a proximal end and a distal end, the end effector symmetrical about a longitudinal axis, the end effector comprising: an attachment portion at the proximal end for coupling to an oscillating driver; and a contact portion extending from the attachment portion, the contact portion configured to contact a target treatment area on a recipient; and at least one aperture extending through the contact portion, wherein when driven by an oscillating driver, the end effector contracts and rebounds about the at least one aperture to transfer energy to the target treatment area in contact with the end effector.

Clause 15. The end effector of clause 14, wherein the at least one aperture comprises a first aperture and a second aperture separated by a membrane.

Clause 16. The end effector of clause 14, wherein the end effector comprises a material having a coefficient of restitution of at least 0.8.

Clause 17. The end effector assembly of clause 14, further comprising a connector configured to couple to the attachment portion at a first end and to the oscillating driver at a second end.

Clause 18. The end effector assembly of clause 17, wherein the connector comprises a connector first end opposing a connector second end, and wherein the end effector comprises an end effector first end opposing an end effector second end, and wherein the connector first end is snap fit to the end effector first end and the connector second end is snap fit to the end effector second end.

Clause 19. The end effector assembly of clause 14, further comprising an inner support member abutting an inner surface of the contact portion, the inner support member defining a width of the at least one aperture.

Clause 20. The end effector assembly of clause 19, wherein the inner support member comprises a first material having a first hardness greater than a second hardness of a second material of the end effector.

Many different arrangements of the various components depicted, as well as components not shown, are possible without departing from the scope of the claims below. Embodiments of the present disclosure have been described with the intent to be illustrative rather than restrictive. Alternative embodiments will become apparent to readers of this disclosure after and because of reading it. Alternative means of implementing the aforementioned can be completed without departing from the scope of the claims below. Certain features and sub-combinations are of utility and may be employed without reference to other features and sub-combinations and are contemplated within the scope of the claims. Although the present disclosure has been described with reference to the embodiments illustrated in the attached drawing figures, it is noted that equivalents may be employed, and substitutions made herein, without departing from the scope of the present disclosure as recited in the claims.

The invention claimed is:

1. An end effector assembly for therapeutics, comprising:

an end effector having an end effector proximal end and an end effector distal end along a longitudinal axis, the end effector further comprising:

an attachment portion at the end effector proximal end, the attachment portion comprising a first material and configured to couple the end effector assembly to a reciprocating therapeutic device; and a toroidal contact portion extending from the attachment portion, the toroidal contact portion defining at least one aperture and comprising the first material, wherein a ratio of an inner width of the toroidal contact portion to an outer width of the toroidal contact portion is at least 0.33, and wherein when driven by the reciprocating therapeutic device, the end effector contracts and rebounds about the at least one aperture to transfer energy to a target treatment area in contact with the end effector;

a connector having a connector distal end coupled to the attachment portion of the end effector and a connector proximal end configured to be coupled to the reciprocating therapeutic device; and an internal support structure comprising a second material distinct from the first material and having a greater hardness than the first material, the internal support structure received through the connector distal end and at least partially within the attachment portion of the end effector.

2. The end effector assembly of claim 1, wherein the first material is an elastomer, and wherein the second material comprises one of: a carbon fiber, aluminum, or a thermoplastic.

3. The end effector assembly of claim 1, wherein the toroidal contact portion comprises a first cross-sectional area and the internal support structure comprises a second cross-sectional area, and wherein the second cross-sectional area is in a range of 10% to 50% of the first cross-sectional area.

4. The end effector assembly of claim 1, wherein the internal support structure comprises a first perimeter that is at least 20% of a second perimeter of the toroidal contact portion.

5. The end effector assembly of claim 1, wherein the first material comprises a coefficient of restitution in a range of 0.7 to 0.85, and wherein the first material comprises a hardness in a range of 50 Shore A to 75 Shore D.

6. The end effector assembly of claim 1, wherein the at least one aperture comprises a first aperture and a second aperture, wherein the first aperture is proximal to the end effector distal end and the second aperture is proximal to the end effector proximal end, and wherein a ratio of a first area of the first aperture to a second area of the second aperture is in a range of 1.5 to 3.

7. The end effector assembly of claim 1, wherein the internal support structure is toroidal and shares an axis of revolution with the toroidal contact portion of the end effector.

8. The end effector assembly of claim 1, further comprising an inner support member abutting an inner surface of the toroidal contact portion.

9. The end effector assembly of claim 8, wherein the inner support member comprises a third material having a hardness greater than the first material.

10. An end effector assembly for therapeutics, comprising:

an end effector having a proximal end and a distal end along a longitudinal axis, the end effector comprising:

an attachment portion at the proximal end, the attachment portion having a bore extending at least partially along the longitudinal axis;

a contact portion extending from the attachment portion; and an aperture extending through the contact portion, wherein the aperture comprises a trapezoidal shape having a first width at the proximal end and a second width distinct from the first width at the distal end, and wherein when driven by a reciprocating driver, the end effector contracts and rebounds about the aperture to transfer energy to a target treatment area in contact with the end effector;

a connector having a connector distal end received within the bore and a connector proximal end configured to couple to the reciprocating driver; and an internal support structure extending through the connector distal end and received through at least a portion of the attachment portion of the end effector.

11. The end effector assembly of claim 10, wherein the first width is greater than the second width.

12. The end effector assembly of claim 10, wherein the second width is greater than the first width.

13. The end effector assembly of claim 10, wherein the end effector is formed from a first material, and wherein the connector is formed from a second material having a greater hardness than the first material, wherein the first material comprises a thermoset polyurethane and the second material comprises a thermoplastic polyurethane.

14. The end effector assembly of claim 10, wherein the end effector comprises an elastomer having a Bayshore resilience of at least 40% and a hardness in a range of 50 Shore A to 75 Shore D.

15. The end effector assembly of claim 10, wherein the end effector and the connector are integral.

16. An end effector assembly for therapeutics, comprising:

a unitary end effector having an end effector proximal end and an end effector distal end, the unitary end effector symmetrical about a longitudinal axis and comprising:

an attachment portion at the end effector proximal end for coupling to an oscillating driver; and a contact portion extending from the attachment portion, the contact portion configured to contact a target treatment area on a recipient; and at least one aperture extending through the contact portion, wherein when driven by the oscillating driver, the end effector contracts and rebounds about the at least one aperture and along the longitudinal axis to transfer energy to the target treatment area in contact with the unitary end effector;

a connector configured to couple to the attachment portion at a connector distal end and to the oscillating driver at a connector proximal end, wherein the connector distal end comprises a first receiving portion opposing a second receiving portion, wherein the attachment portion of the unitary end effector comprises a first attachment portion opposing a second attachment portion, and wherein the first receiving portion is snap fit to the first attachment portion and the second receiving portion is snap fit to the second attachment portion; and an internal support structure disposed internally in the attachment portion of the unitary end effector and at least partially within the contact portion.

17. The end effector assembly of claim 16, wherein the at least one aperture comprises a first aperture and a second aperture separated by a membrane.

18. The end effector assembly of claim 16, wherein the unitary end effector comprises a material having a coefficient of restitution of at least 0.8.

19. The end effector assembly of claim 16, further comprising an inner support member abutting an inner surface of the contact portion, the inner support member defining a width of the at least one aperture.

20. The end effector assembly of claim 19, wherein the inner support member comprises a first material having a first hardness greater than a second hardness of a second material of the unitary end effector.

* * * * *